(12) United States Patent
Farhadiroushan et al.

(10) Patent No.: US 11,079,269 B2
(45) Date of Patent: Aug. 3, 2021

(54) METHOD AND APPARATUS FOR OPTICAL SENSING

(71) Applicant: Silixa Ltd., Elstree (GB)

(72) Inventors: Mahmoud Farhadiroushan, Elstree (GB); Tom Richard Parker, Elstree (GB); Sergey Shatalin, Elstree (GB)

(73) Assignee: Silixa Limited, Elstree Hertfordshire (GB)

( * ) Notice: Subject to any disclaimer, the term of this patent is extended or adjusted under 35 U.S.C. 154(b) by 0 days.

(21) Appl. No.: 16/508,522

(22) Filed: Jul. 11, 2019

(65) Prior Publication Data

US 2019/0331523 A1    Oct. 31, 2019

Related U.S. Application Data

(63) Continuation of application No. 15/368,945, filed on Dec. 5, 2016, now Pat. No. 10,393,572, which is a (Continued)

(30) Foreign Application Priority Data

May 27, 2009  (GB) ........................... 0908990
Jul. 11, 2009  (GB) ........................... 0912051

(51) Int. Cl.
  *G01H 9/00*   (2006.01)
  *G01D 5/353*  (2006.01)
  *E21B 47/002* (2012.01)
  *E21B 47/107* (2012.01)
  (Continued)

(52) U.S. Cl.
  CPC ........... *G01H 9/004* (2013.01); *E21B 47/002* (2020.05); *E21B 47/107* (2020.05);
  (Continued)

(58) Field of Classification Search
  CPC ............... G01H 9/004; G01D 5/35383; G01D 5/35326; G01D 5/35364; G01D 5/35303;
  (Continued)

(56) References Cited

U.S. PATENT DOCUMENTS 3,474,253 A   10/1969  Kessler
3,754,275 A   8/1973   Carter et al.
(Continued)

FOREIGN PATENT DOCUMENTS

CN   1412538 A   4/2003
CN   1841071 A   10/2006
(Continued)

OTHER PUBLICATIONS

FEMA, Technical Manual: Conduits through Embankment Dams Best Practices for Design, Construction, Problem Identification and Evaluation, Inspection, Maintenance, Renovation, and Repair, 2005 (Year: 2005).*

(Continued)

*Primary Examiner* — Peter Radkowski
(74) *Attorney, Agent, or Firm* — Honigman LLP; Matthew H. Szalach

(57) ABSTRACT

The present invention provides novel apparatus and methods for fast quantitative measurement of perturbation of optical fields transmitted, reflected and/or scattered along a length of an optical fibre. The present invention can be used for point sensors as well as distributed sensors or the combination of both. In particular this technique can be applied to distributed sensors while extending dramatically the speed and sensitivity to allow the detection of acoustic perturbations anywhere along a length of an optical fibre while achieving fine spatial resolution. The present invention offers unique advantages in a broad range of acoustic sensing and imaging applications. Typical uses are for (Continued)

monitoring oil and gas wells such as for distributed flow metering and/or imaging, seismic imaging, monitoring long cables and pipelines, imaging within large vessel as well as for security applications.

20 Claims, 16 Drawing Sheets

Related U.S. Application Data continuation of application No. 13/322,449, filed as application No. PCT/GB2010/050889 on May 27, 2010, now Pat. No. 9,541,425.

(51) Int. Cl.
*G01M 11/00* (2006.01)
*G01F 1/66* (2006.01)
*G01V 1/40* (2006.01)

(52) U.S. Cl.
CPC ..... *G01D 5/35303* (2013.01); *G01D 5/35306* (2013.01); *G01D 5/35325* (2013.01); *G01D 5/35335* (2013.01); *G01D 5/35358* (2013.01); *G01D 5/35364* (2013.01); *G01D 5/35377* (2013.01); *G01D 5/35383* (2013.01); *G01F 1/66* (2013.01); *G01F 1/661* (2013.01); *G01M 11/331* (2013.01); *G01V 1/40* (2013.01)

(58) Field of Classification Search
CPC ........... G01D 5/35335; G01D 5/35306; G01D 5/35377; G01D 5/35358; E21B 47/002; E21B 47/107; G01M 11/331; G01F 1/661; G01F 1/66; G01F 1/40
See application file for complete search history.

(56) References Cited

U.S. PATENT DOCUMENTS

| | | |
|---|---|---|
| 4,138,659 A | 2/1979 | Johnson |
| 4,388,622 A | 6/1983 | Fletcher, Jr. |
| 4,428,236 A | 1/1984 | Votava et al. |
| 4,697,456 A | 10/1987 | Maser |
| 4,697,926 A * | 10/1987 | Youngquist ........ G01D 5/35383 356/478 |
| 4,983,034 A | 1/1991 | Spillman, Jr. |
| 5,121,340 A * | 6/1992 | Campbell ........... G01F 23/2962 181/124 |
| 5,177,633 A | 1/1993 | Wong |
| 5,194,847 A | 3/1993 | Taylor et al. |
| 5,218,197 A | 6/1993 | Carroll |
| 5,355,208 A | 10/1994 | Crawford et al. |
| 5,412,474 A | 5/1995 | Reasenberg et al. |
| 5,417,112 A | 5/1995 | Rosenberg |
| 5,521,704 A | 5/1996 | Thiel |
| 5,596,410 A | 1/1997 | Hantel et al. |
| 5,636,021 A * | 6/1997 | Udd .................. G01D 5/35383 356/483 |
| 5,754,293 A | 5/1998 | Farhadiroushan |
| 5,946,429 A | 8/1999 | Huang et al. |
| 6,079,875 A | 6/2000 | Klass et al. |
| 6,097,478 A | 8/2000 | Berthold et al. |
| 6,097,486 A | 8/2000 | Vakoc et al. |
| 6,105,430 A | 8/2000 | Kepler et al. |
| 6,195,162 B1 | 2/2001 | Varnham et al. |
| 6,212,003 B1 | 4/2001 | Komazawa et al. |
| 6,236,452 B1 | 5/2001 | Goto et al. |
| 6,354,147 B1 | 3/2002 | Gysling et al. |
| 6,426,496 B1 | 7/2002 | Froggatt et al. |
| 6,449,046 B1 | 9/2002 | Huang et al. |
| 6,466,706 B1 | 10/2002 | Go et al. |
| 6,522,797 B1 | 2/2003 | Siems et al. |
| 6,536,291 B1 | 3/2003 | Gysling et al. |
| 6,555,807 B2 | 4/2003 | Clayton et al. |
| 6,591,025 B1 | 7/2003 | Siems et al. |
| 6,631,224 B2 | 10/2003 | Sorin et al. |
| 6,687,008 B1 | 2/2004 | Peale et al. |
| 6,691,584 B2 | 2/2004 | Gysling et al. |
| 6,782,150 B2 | 8/2004 | Davis et al. |
| 6,785,004 B2 | 8/2004 | Kersey et al. |
| 6,847,034 B2 | 1/2005 | Shah et al. |
| 6,913,079 B2 * | 7/2005 | Tubel .................... E21B 47/135 166/250.01 |
| 6,959,604 B2 | 11/2005 | Bryant et al. |
| 7,038,784 B2 | 5/2006 | Hall |
| 7,084,807 B2 | 8/2006 | Steinbuch et al. |
| 7,095,505 B1 | 8/2006 | Beard et al. |
| 7,127,132 B1 | 10/2006 | Moslehi et al. |
| 7,245,385 B2 | 7/2007 | Kersey |
| 7,271,884 B2 | 9/2007 | Payton |
| 7,339,678 B2 | 3/2008 | Hall et al. |
| 7,355,163 B2 | 4/2008 | Watley et al. |
| 7,357,021 B2 | 4/2008 | Blacklaw |
| 7,460,245 B2 | 12/2008 | Hill |
| 7,488,929 B2 | 2/2009 | Townley-Smith et al. |
| 7,548,319 B2 | 6/2009 | Hartog |
| 7,742,157 B2 | 6/2010 | Lewis et al. |
| 7,764,363 B2 | 7/2010 | Hayward et al. |
| 7,946,341 B2 | 5/2011 | Hartog et al. |
| 9,140,582 B2 | 9/2015 | Farhadiroushan et al. |
| 9,541,425 B2 | 1/2017 | Farhadiroushan et al. |
| 9,677,957 B2 | 6/2017 | Dong et al. |
| 9,768,863 B2 | 9/2017 | Hayward et al. |
| 9,787,394 B2 | 10/2017 | Lewis et al. |
| 9,983,293 B2 * | 5/2018 | Farhadiroushan ..... G01H 9/004 |
| 2001/0030796 A1 | 10/2001 | Yao |
| 2002/0025097 A1 | 2/2002 | Cooper et al. |
| 2002/0041722 A1 | 4/2002 | Johnson et al. |
| 2002/0063866 A1 | 5/2002 | Kersey et al. |
| 2002/0064330 A1 | 5/2002 | Croteau et al. |
| 2002/0064331 A1 | 5/2002 | Davis et al. |
| 2002/0080450 A1 | 6/2002 | Hait |
| 2002/0131108 A1 | 9/2002 | Hait |
| 2002/0131111 A1 | 9/2002 | Hait |
| 2002/0134144 A1 | 9/2002 | Gysling et al. |
| 2002/0181038 A1 | 12/2002 | Hait |
| 2002/0194932 A1 | 12/2002 | Gysling et al. |
| 2003/0038231 A1 | 2/2003 | Bryant et al. |
| 2003/0072051 A1 | 4/2003 | Myers |
| 2003/0094281 A1 * | 5/2003 | Tubel .................... E21B 47/135 166/250.03 |
| 2003/0095262 A1 | 5/2003 | Blake |
| 2004/0047534 A1 | 3/2004 | Shah et al. |
| 2004/0065444 A1 | 4/2004 | Smith et al. |
| 2004/0226386 A1 | 11/2004 | Gysling et al. |
| 2004/0239555 A1 | 12/2004 | Steinbuch et al. |
| 2005/0008322 A1 | 1/2005 | Sullivan et al. |
| 2005/0012935 A1 | 1/2005 | Kersey |
| 2005/0077455 A1 | 4/2005 | Townley-Smith et al. |
| 2005/0180263 A1 | 8/2005 | Lambert et al. |
| 2005/0224229 A1 | 10/2005 | Blacklaw |
| 2006/0018586 A1 | 1/2006 | Kishida |
| 2006/0028636 A1 | 2/2006 | Payton |
| 2006/0101915 A1 | 5/2006 | Thompson et al. |
| 2006/0146337 A1 | 7/2006 | Hartog |
| 2006/0212231 A1 | 9/2006 | Bailey |
| 2006/0225507 A1 | 10/2006 | Paulson |
| 2006/0262889 A1 | 11/2006 | Kalvaitis et al. |
| 2007/0009007 A1 | 1/2007 | Nicholls et al. |
| 2007/0041020 A1 | 2/2007 | Hall |
| 2007/0145251 A1 | 6/2007 | Ogura et al. |
| 2008/0025146 A1 | 1/2008 | Welker |
| 2008/0088846 A1 * | 4/2008 | Hayward ............... G01H 9/004 356/446 |
| 2008/0144016 A1 | 6/2008 | Lewis et al. |
| 2008/0170742 A1 | 7/2008 | Trusov et al. |
| 2008/0277568 A1 | 11/2008 | Crickmore et al. |
| 2009/0015301 A1 | 1/2009 | Marchesini |
| 2009/0114386 A1 | 5/2009 | Hartog et al. |
| 2009/0129785 A1 | 5/2009 | Murakami |
| 2009/0323734 A1 | 12/2009 | Drodofsky et al. |

(56) References Cited

U.S. PATENT DOCUMENTS

| | | | |
|---|---|---|---|
| 2010/0200743 A1* | 8/2010 | Forster | E21B 47/0224 250/254 |
| 2013/0319121 A1 | 12/2013 | Hill et al. | |

FOREIGN PATENT DOCUMENTS

| | | |
|---|---|---|
| CN | 101297336 A | 10/2008 |
| DE | 3828943 A1 | 3/1990 |
| DE | 9318404 U1 | 2/1994 |
| DE | 19506180 C1 | 6/1996 |
| DE | 10338952 A1 | 3/2005 |
| EP | 0944813 A1 | 9/1999 |
| EP | 1286133 A2 | 2/2003 |
| EP | 1488482 A2 | 12/2004 |
| EP | 1615011 A1 | 1/2006 |
| EP | 1895328 A1 * | 8/2006 |
| EP | 1734223 A2 | 12/2006 |
| EP | 1853964 A1 | 11/2007 |
| EP | 1895328 A1 | 3/2008 |
| EP | 1968165 A2 | 9/2008 |
| EP | 2029993 A2 | 3/2009 |
| EP | 2098842 A1 | 9/2009 |
| EP | 2362190 A1 | 8/2011 |
| EP | 2364226 A1 | 9/2011 |
| GB | 2145514 A | 3/1985 |
| GB | 2191909 A | 12/1987 |
| GB | 2197953 A | 6/1988 |
| GB | 2329960 A | 4/1999 |
| GB | 2354782 A | 4/2001 |
| GB | 2367890 A | 4/2002 |
| GB | 2396011 A | 6/2004 |
| GB | 2401738 A | 11/2004 |
| GB | 2408327 A | 5/2005 |
| GB | 2414543 A | 11/2005 |
| GB | 2442745 A | 4/2008 |
| GB | 2443661 A | 5/2008 |
| GB | 2445364 A | 7/2008 |
| GB | 2456300 A | 7/2009 |
| GB | 2462096 A | 1/2010 |
| GB | 2467177 A | 7/2010 |
| GB | 2469709 A | 10/2010 |
| JP | S5948664 A | 3/1984 |
| JP | H11237287 A | 8/1999 |
| JP | 2005345137 A | 12/2005 |
| JP | 2007240287 A | 9/2007 |
| JP | 2009031040 A | 2/2009 |
| WO | WO-9827406 A1 | 6/1998 |
| WO | WO-0246737 A2 | 6/2002 |
| WO | WO-03077381 A2 | 9/2003 |
| WO | WO-2004029671 A2 | 4/2004 |
| WO | WO-2004070346 A2 | 8/2004 |
| WO | WO-2004102242 A1 | 11/2004 |
| WO | WO-2004102840 A1 | 11/2004 |
| WO | WO-2006048647 A2 | 5/2006 |
| WO | WO-2006092606 A1 | 9/2006 |
| WO | WO-2006130499 A2 | 12/2006 |
| WO | WO-2007021287 A1 | 2/2007 |
| WO | WO-2007049004 A1 | 5/2007 |
| WO | WO-2007109127 A2 | 9/2007 |
| WO | WO-2007131794 A2 | 11/2007 |
| WO | WO-2008056143 A1 | 5/2008 |
| WO | WO-2008060719 A2 | 5/2008 |
| WO | WO-2009056855 A1 | 5/2009 |
| WO | WO-2010009007 A1 | 1/2010 |
| WO | WO-2010020781 A1 | 2/2010 |
| WO | WO-2010065478 A1 | 6/2010 |
| WO | WO-2010091404 A1 | 8/2010 |
| WO | WO-2010116119 A2 | 10/2010 |
| WO | WO-2011058322 A2 | 5/2011 |

OTHER PUBLICATIONS

Anders M. Johansson, Acoustic Sound Source Localisation and Tracking In Indoor Environments, Blekinge Institute of Technology Doctoral Dissertation Series, 2008 (Year: 2008).*

Johansson, Sam et al., Distributed Strain Measurements for Embankment Dams . Laboratory Tests, Installation, and Initial Monitoring Experiences, Elforsk rapport 03:19, 2003 (Year: 2003).*

Johansson, Sam et al., Distributed Strain Measurements for Embankment Dams—Field tests at Ajaure Dam 2004-05, Elforsk rapport 05:32, 2005 (Year: 2005).*

Johansson, Sam et al., Distributed sensing of seepage and movements using optical fibers—Results from some embankment dams in Sweden, International Water Power and Dam Construction, 2005. (Year: 2005).*

Kluth et al., Case Studies on Distributed Temperature and Strain Sensing (DTSS) by using optic fibre, International Conference on Condition Monitoring and Diagnosis, 2006 (Year: 2006).*

Sjödahl, P. (2006). Resistivity investigation and monitoring for detection of internal erosion and anomalous seepage in embankment dams. Engineering Geology, Lund University. (Year: 2006).*

Wen et al., Mapping Oil Seeps on the Sea Floor by Gloria Side-Scan Sonar Images—A Case Study from the Northern Gulf of Mexico, Nonrenewable Resources, vol. 5, No. 3, 1996 pp. 149-151 (Year: 1996).*

Zou et al. Detection of micrometer crack by Brillouin-scattering-based distributed strain and temperature sensor, 19th International Conference on Optical Fibre Sensors, Proc. of SPIE vol. 7004, 700419, (2008) (Year: 2008).*

Canadian Intellectual Property Office, Requisition by the Examiner in Accordance with Subsection 86(2) of the Patent Rules for CA Application No. 3,035,948, dated Apr. 22, 2020.

Kersey, et al, "Polarisation-insensitive fibre optic Michelson interferometer", Electronics Letters, IEEE Stevenage, GB, vol. 27, No. 6, Mar. 14, 1991, pp. 518-520.

Sun, et al, "General Analysis of 3X3 Optical-Fiber Directional Couplers", Microwave and Optical Technology Letters USA, vol. 2, No. 2, Feb. 1989, pp. 52-54.

Brown, et al, "A symmetric 3x3 coupler based demodulator for fiber optic interferometric sensors", Proceedings of the SPIE—The International Society for Optical Engineering USA, vol. 1584, Dec. 1991, pp. 328-335.

Zhiqiang Zhao et al, "Improved Demodulation Scheme for Fiber Optic Interferometers Using an Asymmetric 33 Coupler", Journal of Lightwave Technology, IEEE Service Center, New York, NY, US, vol. 15, No. 11, Nov. 1, 1997.

International Search Report for International App. No. PCT/GB2010/050889.

International Search Report for International App. No. PCT/GB2010/050888.

Examination Report issued in corresponding Great Britain Application No. GB1120619.0 dated Mar. 14, 2014 (3 pages).

Examination Report issued in corresponding Australian Application No. 2010252747 dated Jun. 11, 2014 (3 pages).

Office Action issued in corresponding Chinese Application No. 201080033359.9 with English translation dated Apr. 16, 2014 (14 pages).

Combined Search and Examination Report issued in British Application No. GB1412510.8; dated Aug. 7, 2014 (7 pages).

Search and Examination Report issued in British Application No. GB1412510.8; dated Sep. 11, 2014 (3 pages).

Search and Examination Report issued in British Application No. GB1412510.8; dated Sep. 11, 2014 (5 pages).

Search and Examination Report issued in British Application No. GB1412510.8; dated Sep. 11, 2014 (6 pages).

Search and Examination Report issued in British Application No. GB1412510.8; dated Sep. 11, 2014 (4 pages).

Search and Examination Report issued in British Application No. GB1412510.8; dated Sep. 15, 2014 (4 pages).

Shatalin, Sergey et al., "Interferometric optical time-domain reflectometry for distributed optical-fiber sensing", Applied Optics, vol. 37, No. 24, pp. 5600-5604, Aug. 20, 1998 (5 pages).

(56) References Cited

OTHER PUBLICATIONS

Combined Search and Examination Report issued in British Application No. GB1414505.6; dated Sep. 29, 2014 (5 pages).
Combined Search and Examination Report issued in British Application No. GB1419009.4; dated Nov. 28, 2014 (5 pages).
Examination Report issued in corresponding Australian Application No. 2010252746 dated Jul. 4, 2014 (3 pages).
Examination Report issued in corresponding GB Application No. 1120615.8 dated Feb. 11, 2014 (2 pages).
Office Action issued in corresponding Chinese Application No. 201080032395.3 dated Mar. 17, 2014 (10 pages).
Combined Search and Examination Report issued in British Application No. GB1421509.9; dated Jan. 26, 2015 (8 pages).
Combined Search and Examination Report issued in British Application No. GB1421507.3; dated Jan. 27, 2015 (6 pages).
Combined Search and Examination Report issued in British Application No. GB1422080.0; dated Jan. 29, 2015 (7 pages).
Combined Search and Examination Report issued in British Application No. GB1502005.0; dated Feb. 16, 2015 (7 pages).
Search Report issued in British Application No. GB1419110.0; dated Dec. 11, 2014 (1 pages).
Search Report issued in British Application No. GB1419594.5; dated Dec. 12, 2014 (1 page).
Search Report issued in British Application No. GB1421508.1; dated Dec. 19, 2014 (1 page).
Combined Search and Examination Report issued in British Application No. GB1421510.7; dated Jan. 20, 2015 (7 pages).
Combined Search and Examination Report issued in British Application No. GB1415258.1; dated Oct. 20, 2014 (7 pages).
Combined Search and Examination Report issued in British Application No. GB1416571.6; dated Oct. 22, 2014 (6 pages).
Combined Search and Examination Report issued in British Application No. GB1419107.6; dated Nov. 28, 2014 (8 pages).
Combined Search and Examination Report issued in British Application No. GB1419112.6; dated Nov. 28, 2014 (7 pages).
Combined Search and Examination Report issued in British Application No. GB1419120.9; dated Nov. 28, 2014 (9 pages).
Combined Search and Examination Report issued in British Application No. GB1419116.7; dated Dec. 2, 2014 (6 pages).
"Improved demodulation scheme for fiber optic interferometers using an asymmetric 3x3 coupler", Journal of lightwave technology, vol. 15, No. 11, Nov. 1997, Z. Zhao et al., pp. 2059-2068.
Office Action issued in U.S. Appl. No. 13/322,448; dated Aug. 30, 2013 (40 pages).
Office Action issued in U.S. Appl. No. 13/322,448; dated Feb. 12, 2014 (29 pages).
Office Action issued in U.S. Appl. No. 13/322,448; dated Oct. 21, 2014 (20 pages).
Notice of Allowance issued in U.S. Appl. No. 13/322,448; dated Jul. 2, 2015 (7 pages).
Examination Report issued in British Application No. GB1419116.7; dated May 5, 2015 (5 pages).
Examination Report issued in British Application No. GB1419116.7; dated May 21, 2015 (2 pages).
Examination Report issued in British Application No. GB1419594.5; dated May 22, 2015 (4 pages).
Examination Report issued in British Application No. GB1419110.0; dated Jun. 25, 2015 (4 pages).
Examination Report issued in British Application No. GB1419112.6; dated Jun. 25, 2015 (3 pages).
Examination Report issued in British Application No. GB1421510.7; dated Jun. 30, 2015 (4 pages).
Examination Report issued in British Application No. GB1422080.0; dated Jun. 30, 2015 (9 pages).
Office Action issued in U.S. Appl. No. 14/662,940; dated Feb. 5, 2016 (20 pages).
Examination Report issued in Canadian Patent Application No. 2,763,391; dated Apr. 20, 2016 (4 pages).
Zhang et al., Water wave frequency detection by optical fiber sensor, Optics Communications 281 (2008) 6011. (5 pages).
Zhang et al., Continuous and Damped Vibration Detection Based on Fiber Diversity Detection Sensor by Rayleigh Backscattering, Journal of Lightwave Technology, V. 26, N. 7, 2008 (7 pages).
Office Action in related U.S. Appl. No. 15/368,954 dated Aug. 31, 2018 (25 pages).
Gifford et al., "Swept-wavelength interferometric interrogation of fiber Rayleigh scatter for distributed sensing applications", Fiber Optic Sensors and Applications V, edited by Eric Udd, Proc. of SPIE vol. 6770, 67700F, (2007). 0277-786X/07/$18 _ doi: 10.1 1171 12.734931 (10 pages).
Kang et al., "Simultaneous measurement of strain, temperature and vibration frequency using a fibre optic sensor", Meas. Sci Technol. 13 (2002) 1191-1196 (7 pages).
Manuel et al., "Location of a time-varying disturbance using an array of identical fiber-optic interferometers interrogated by CW DFB laser", Dec. 8, 2008 Ivol. 16, No. 25/Optics Express 20666 (10 pages).
Painchaud et al., "Interferometric time measurements of intermodal dispersion in optical fibers by using a CCD photodetector array," Opt. Lett. 17, 1423-1425 (1992) (3 pages).
Posey et al., "Strain Sensing Based on Coherent Rayleigh Scattering in an Optical Fibre," Electron. Lett. 36, 2000. (2 pages).
Zhang et al., "Distributed optical fiber vibration sensor based on spectrum analysis of Polarization-OTDR system," Opt. Express 16, 10240-10247 (2008) (8 pages).
Office Action in related U.S. Appl. No. 15/048,315 dated Jan. 5, 2017. (33 pages).
Office Action in related U.S. Appl. No. 15/368,954 dated Jan. 18, 2017 (16 pages).
USPTO, Non-Final Office Action for U.S. Appl. No. 15/368,945 dated Jan. 13, 2017.
USPTO, Non-Final Office Action for U.S. Appl. No. 15/368,945 dated Aug. 24, 2017.
USPTO, Non-Final Office Action for U.S. Appl. No. 15/368,945 dated Jun. 5, 2018.
USPTO, Non-Final Office Action for U.S. Appl. No. 15/368,945 dated Sep. 10, 2018.

* cited by examiner

METHOD AND APPARATUS FOR OPTICAL SENSING

CROSS-REFERENCE TO RELATED APPLICATIONS

This application is a continuation of U.S. patent application Ser. No. 15/368,945, filed on Dec. 5, 2016, which is a continuation of U.S. patent application Ser. No. 13/322,449, filed on Nov. 23, 2011 (now U.S. Pat. No. 9,541,425), which is a 371 of international Application No. PCT/GB2010/050889, filed on May 27, 2010, which claims priority to GB Application No. 0912051.0, filed on Jul. 11, 2009, and to GB Application No. 0908990.5, filed on May 27, 2009, the disclosures of which are incorporated herein by reference in their entity.

FIELD OF THE INVENTION

The present invention relates to optical sensors and, in particular, distributed optical fibre sensors and applications thereof.

BACKGROUND TO THE INVENTION

The benefits of optical fibres have been demonstrated in a number of sensing applications. The two major areas are: (i) distributed optical fibre sensors, and (ii) multiplexed point sensor arrays.

Distributed sensors utilise the intensity of backscatter light, with Raman and/or Brillouin peaks in the light signal utilised to measure temperature, strain or pressure. Distributed sensors offer a number of advantages including continuous sensing along the entire length of fibre, and flexibility and simplicity of the sensor, which may be standard telecoms optical fibre. For example, a distributed sensor may provide 10,000 measurement points along 10 km of optical fibre with a 1 m spatial resolution. Distributed sensor systems therefore offer low installation and ownership costs.

However, due to their slow response, distributed sensors are usually only used in applications where measurements taking in order of several seconds to hours are acceptable. The most common sensors of this type are the distributed temperature sensors (DTS), which are made by a number of companies. A typical performance of a DTS is 1 m spatial resolution and 1° C. temperature resolution in 60 seconds over a 10 km range.

Distributed sensors have also been used to measure strain by utilising Brillouin shifts in reflected or backscattered light, as described in U.S. Pat. No. 6,555,807 [1] or WO 98/27406 [2]. The frequency of the Brillouin shift is about 1 MHz/10µε and its linewidth is about 30 MHz. The strain in an order of 10µε can be determined along an optical fibre using the narrow frequency scanning methods described. However, using these approaches, the scanning rate is much slower than the pulse repetition rate and measurement times are typically in the order of few seconds to few minutes.

More recently, a technique for faster measurement of Brillouin frequency shift has been proposed in U.S. Pat. No. 7,355,163 [3]. This technique uses a frequency to amplitude convertor which may be in a form of an optical fibre Mach-Zehnder interferometer with a 3×3 coupler at its output. However, the strain resolution is limited by the linewidth of the Brillouin light and therefore the optical path length difference in the interferometer should be kept within the coherence length of the Brillouin light. Also, the polarisation fading between the two paths of the interferometer, the offset and gain variations of the photodetector receivers would significantly limit the strain measurement. Measurement times of around 0.1 seconds (10 Hz) with strain resolution of 50µε have been recently reported using this technique.

For many applications, such as acoustic sensing, much higher sensitivities and faster a measurement time in the order of 1 millisecond (1 kHz), 0.1 millisecond (10 kHz) or 0.01 millisecond (100 kHz) is required.

Multiplexed point sensors offer fast measurements with high sensitivity and are used, for example, in hydrophone arrays. The main application for these in the energy market is for towed and seafloor seismic arrays. However, unlike with distributed sensors, multiplexed point sensors cannot be used where full coverage is required. The size and the position of the sensing elements are fixed and the number of sensors multiplexed on a single fibre is typically limited to 50 to 100 elements. Furthermore, the sensor design relies on additional optical fibre components leading to bulky and expensive array architectures. There is also considerable effort to increase the number of sensors that can be efficiently multiplexed on a single length of fibre.

Optical-time-domain reflectometry (OTDR) is a well known technique that has been used to test optical fibre communications cables. In order to reduce the effect of coherent backscatter interference, which is sometime is referred to as Coherent Rayleigh Noise, a broadband light source is normally used. However, proposals have also been made in U.S. Pat. No. 5,194,847 [4] to use coherent OTDR for sensing intrusion by detecting the fast changes in a coherent backscatter Rayleigh signal. In addition, Shatalin et al. [5] describes using coherent Rayleigh as a distributed optical fibre alarm sensor.

WO 2008/056143 [6] describes a disturbance sensor similar to that of U.S. Pat. No. 5,194,847 [4] using a semiconductor distributed feedback laser source. A fibre Bragg grating filter of preferably 7.5 GHz is used to reject out-of-band chirped light and, thereby, improve the coherence of the laser pulse sent into the fibre. However, this requires matching of the laser wavelength with the narrow band optical filter, which results in the signal visibility variation being reduced compared to a system which uses a very high coherent source as proposed by U.S. Pat. No. 5,194,847.

Similar techniques have also been proposed for the detection of buried optical fibre telecommunication cables (for example in WO 2004/102840 [7]), in perimeter security (GB 2445364 [8] and US2009/0114386 [9]) and downhole vibration monitoring (WO 2009/056855 [10]). However, the response of these coherent Rayleigh backscatter systems has been limited by a number of parameters such as polarisation and signal fading phenomena; the random variation of the backscatter light; and non-linear coherent Rayleigh response. Therefore these techniques are mainly used for event detection and do not provide quantitative measurements, such as the measurement of acoustic amplitude, frequency and phase over a wide range of frequency and dynamic range.

SUMMARY OF THE INVENTION

The present invention provides novel apparatus and methods for fast quantitative measurement of perturbation of optical fields transmitted, reflected and or scattered along a length of an optical fibre.

The present invention can be used for distributed sensors, point sensors, or the combination of both.

In particular this technique can be applied to distributed sensors while extending dramatically the speed and sensitivity to allow the detection of acoustic perturbations anywhere along a length of an optical fibre while achieving fine spatial resolution. The present invention offers unique advantages in a broad range of acoustic sensing and imaging applications. Typical uses are for monitoring oil and gas wells, for applications such as for distributed flow metering and/or imaging; seismic imaging, monitoring long cables and pipelines; acoustic imaging inside large vessels as well as security applications.

It is an object of the present invention to provide apparatus for highly sensitive and fast quantitative measurement of the phase, frequency and amplitude of the light transmitted, reflected or scattered along a length of an optical fibre.

In the prior art, optical couplers have been used in Michelson or Mach-Zehnder interferometer configurations where the polarisation between the two arms of the interferometer has to be carefully controlled. The novel interferometer in the present invention allows an m×m coupler to be utilised using non-reciprocal devices, such as Faraday rotator mirrors and an optical circulator, to provide compensated light interference with a given phase shift that can be measured at all ports of the optical coupler and analysed very quickly, such as at several tens of kilohertz.

The embodiments of the invention can be used for multiplexed acoustic point sensors, distributed sensors or a combination of both. In the case of distributed sensors, light pulses are injected into the fibre and the phase modulation of the backscattered light is measured along the fibre at several tens of kilohertz. The fibre can be standard telecommunication fibre and/or cable. Using the techniques described herein, the sensing system can thereby detect the acoustic field along the fibre to provide a distributed acoustic sensor whereby the lengths of the sensing elements can be selected by a combination of adjusting the modulation of the light pulse, the path length in the interferometer as well as the sensing fibre configuration.

The data collected along the fibre are automatically synchronised and they may be combined to provide coherent field images.

BRIEF DESCRIPTION OF THE DRAWINGS

Embodiments of the invention and how to put it into practice are described by way of example with reference to the accompanying drawings in which.

DETAILED DESCRIPTION OF PREFERRED EMBODIMENTS

Figure 1:
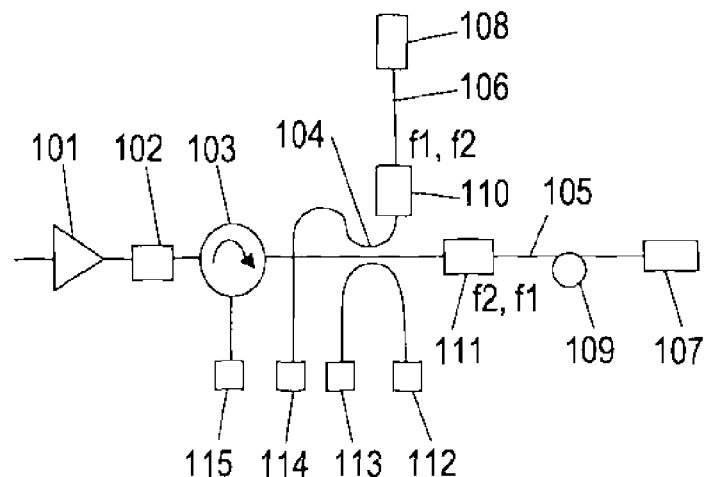
FIGS. 1, 2, 3 and 4 show schematically novel interferometer apparatus according to related embodiments of the invention, comprising circulators and multiple fibre couplers with different optical paths through the interferometers, Faraday-rotator mirrors and photodetectors.

FIG. 1 shows a first embodiment, generally depicted at 100, of a novel interferometer for measuring the optical amplitude, phase and frequency of an optical signal. The incoming light from a light source (not shown) is preferably amplified in an optical amplifier 101, and transmitted to the optical filter 102. The filter 102 filters the out of band Amplified Spontaneous Emission noise (ASE) of the amplifier 101. The light then enters into an optical circulator 103 which is connected to a 3×3 optical coupler 104. A portion of the light is directed to the photodetector 112 to monitor the light intensity of the input light. The other portions of light are directed along first and second optical paths 105 and 106, with a path length difference between the two paths. Faraday-rotator mirrors (FRMs) 107 and 108 reflect the light back through the first and second paths 105 and 106, respectively. The Faraday rotator mirrors provide self-polarisation compensation along optical paths 105 and 106 such that the two portions of light efficiently interfere at each of the 3×3 coupler 104 ports. The optical coupler 104 introduces relative phase shifts of 0 degrees, +120 degrees and −120 degrees to the interference signal, such that first, second and third interference signal components are produced, each at a different relative phase.

First and second interference signal components are directed by the optical coupler 104 to photodetectors 113 and 114, which measure the intensity of the respective interference signal components.

The circulator 103 provides an efficient path for the input light and the returning (third) interference signal component through the same port of the coupler 104. The interference signal component incident on the optical circulator 103 is directed towards photodetector 115 to measure the intensity of the interference signal component.

The outputs of the photodetectors 113, 114 and 115 are combined to measure the relative phase of the incoming light, as described in more detail below with reference to FIGS. 7 and 9.

Optionally, frequency shifters 110 and 111 and/or optical modulator 109 may be used along the paths 105 and 106 for heterodyne signal processing. In addition, the frequency shift of 110 and 111 may be alternated from f1, f2 to f2, f1 respectively to reduce any frequency-dependent effect between the two portions of the light propagating through optical paths 105 and 106.

The above-described embodiment provides a novel apparatus suitable for fast quantitative measurement of perturbation of optical fields, and in particular can be used for distributed and multiplexed sensors with high sensitivity and fast response times to meet requirements of applications such as acoustic sensing.

Figure 7:
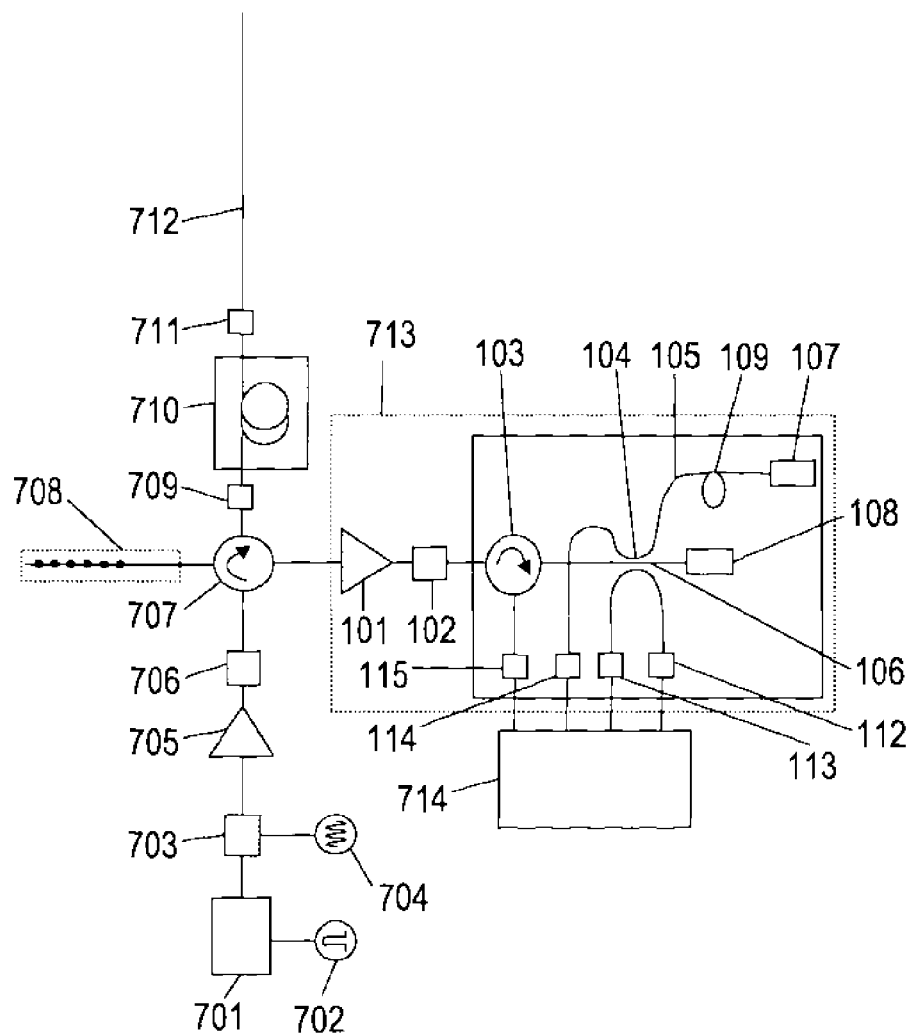
FIG. 7 shows schematically a sensor system that utilises the interferometer of an embodiment of the invention for fast measurement of scattered and reflected light from an optical fibre.

FIG. 7 shows an application of the interferometer of FIG. 1 to the distributed sensing of an optical signal from an optical system 700. It will be apparent that although the application is described in the context of distributed sensing, it could also be used for point sensing, for example by receiving reflected light from one or more point sensors coupled to the optical fibre.

In this embodiment 700, light emitted by a laser 701 is modulated by a pulse signal 702. An optical amplifier 705 is used to boost the pulsed laser light, and this is followed by a band-pass filter 706 to filter out the ASE noise of the amplifier. The optical signal is then sent to an optical circulator 707. An additional optical filter 708 may be used at one port of the circulator 707. The light is sent to sensing fibre 712, which is for example a single mode fibre or a multimode fibre deployed in an environment in which acoustic perturbations are desired to be monitored. A length of the fibre may be isolated and used as a reference section 710, for example in a "quiet" location. The reference section 710 may be formed between reflectors or a combination of beam splitters and reflectors 709 and 711.

The reflected and the backscattered light generated along the sensing fibre 712 is directed through the circulator 707 and into the interferometer 713. The detailed operation of the interferometer 713 is described earlier with reference to FIG. 1. In this case, the light is converted to electrical signals using fast low-noise photodetectors 112, 113, 114 and 115. The electrical signals are digitised and then the relative optical phase modulation along the reference fibre 710 and the sensing fibre 712 is computed using a fast processor unit 714 (as will be described below). The processor unit is time synchronised with the pulse signal 702. The path length difference between path 105 and path 106 defines the spatial resolution. The photodetector outputs may be digitised for multiple samples over a given spatial resolution. The multiple samples are combined to improve the signal visibility and sensitivity by a weighted averaging algorithm combining the photodetector outputs.

It may be desirable to change the optical frequency of the light slightly to improve the sensitivity of the backscattered or reflected signals. The optical modulator 703 may be driven by a microwave frequency of around 10-40 GHz to generate optical carrier modulation sidebands. The optical filter 708 can be used to select the modulation sidebands which are shifted relative to the carrier. By changing the modulation frequency it is possible to rapidly modulate the selected optical frequency.

Data Processing

Figure 9:
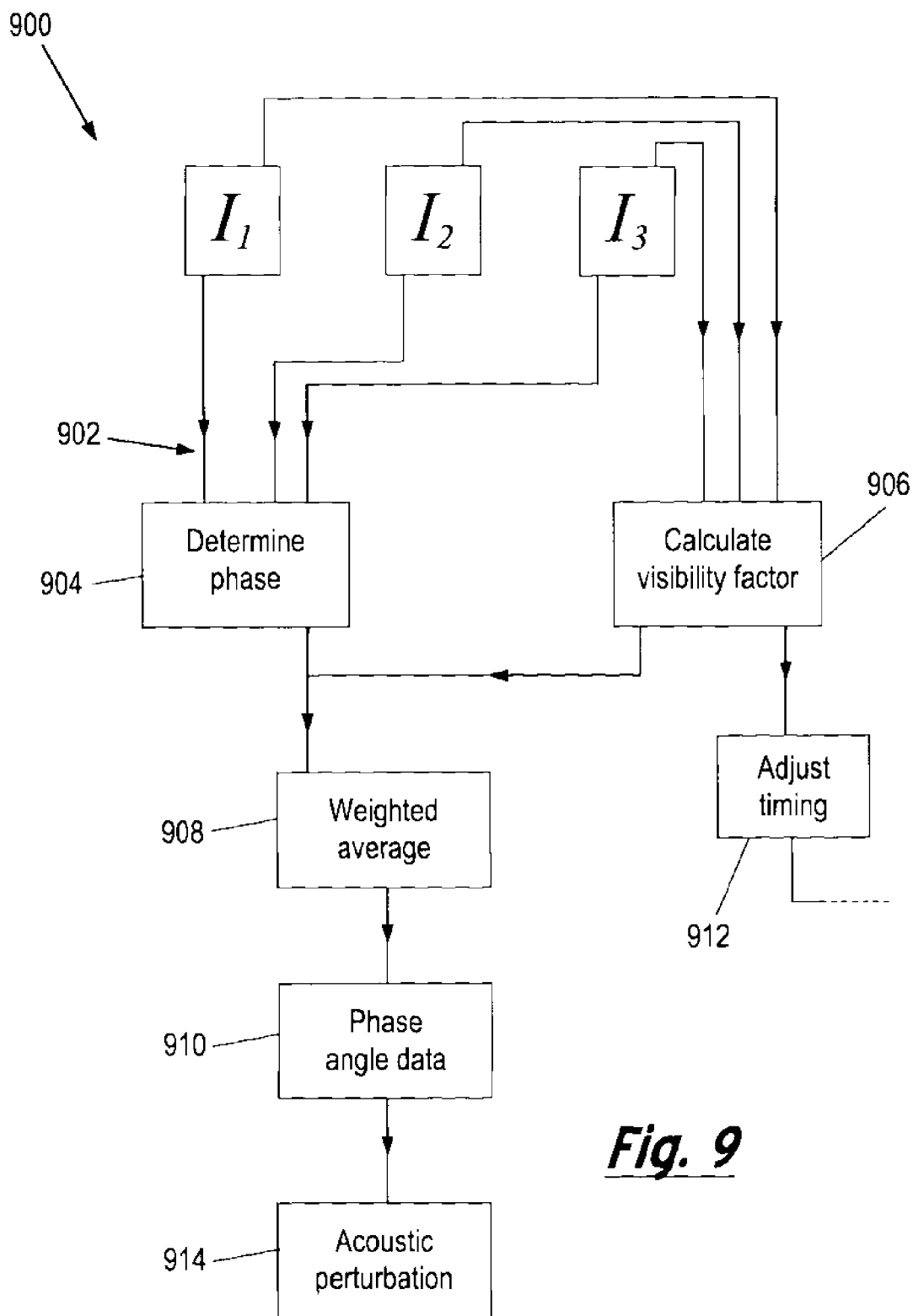
FIG. 9 is a block diagram representing a data processing method according to an embodiment of the invention.

FIG. 9 schematically represents a method 1100 by which the optical phase angle is determined from the outputs of the photodetectors 113, 114, 115. The path length difference between path 105 and path 106 defines the spatial resolution of the system. The photodetector outputs may be digitised for multiple samples over a given spatial resolution, i.e. the intensity values are oversampled. The multiple samples are combined to improve the signal visibility and sensitivity by a weighted averaging algorithm combining the photo-detector outputs.

The three intensity measurements $I_1$, $I_2$, $I_3$, from the photodetectors 113, 114, 115 are combined at step 1102 to calculate the relative phase and amplitude of the reflected or backscattered light from the sensing fibre. The relative phase is calculated (step 1104) at each sampling point, and the method employs oversampling such that more data points are available than are needed for the required spatial resolution of the system.

Methods for calculating the relative phase and amplitude from three phase shifted components of an interference signal are known from the literature. For example, Zhiqiang Zhao et al. [12] and U.S. Pat. No. 5,946,429 [13] describe techniques for demodulating the outputs of 3×3 couplers in continuous wave multiplexing applications. The described techniques can be applied to the time series data of the present embodiment.

For each sampling point, a visibility factor V is calculated at step 1106 from the three intensity measurements $I_1$, $I_2$, $I_3$, from the photodetectors 113, 114, 115, according to equation (1), for each pulse.

$$V=(I_1-I_2)^2+(I_2-I_3)^2+(I_3-I_1)^2 \qquad (1)$$

At a point of low visibility, the intensity values at respective phase shifts are similar, and therefore the value of V is low. Characterising the sampling point according the V allows a weighted average of the phase angle to be determined (step 1108), weighted towards the sampling points with good visibility. This methodology improves the quality of the phase angle data 1110.

Optionally, the visibility factor V may also be used to adjust (step 1112) the timing of the digital sampling of the light for the maximum signal sensitivity positions. Such embodiments include a digitiser with dynamically varying clock cycles, (which may be referred to herein as "iclock"). The dynamically varying clock may be used to adjust the timing of the digitised samples at the photodetector outputs for the position of maximum signal sensitivity and or shifted away from positions where light signal fading occurs.

The phase angle data is sensitive to acoustic perturbations experienced by the sensing fibre. As the acoustic wave passes through the optical fibre, it causes the glass structure to contract and expand. This varies the optical path length between the backscattered light reflected from two locations in the fibre (i.e. the light propagating down the two paths in the interferometer), which is measured in the interferometer as a relative phase change. In this way, the optical phase angle data can be processed at 1114 to measure the acoustic signal at the point at which the light is generated.

In preferred embodiments of the invention, the data processing method 1100 is performed utilising a dedicated processor such as a Field Programmable Gate Array.

Sensor Calibration

Figure 10:
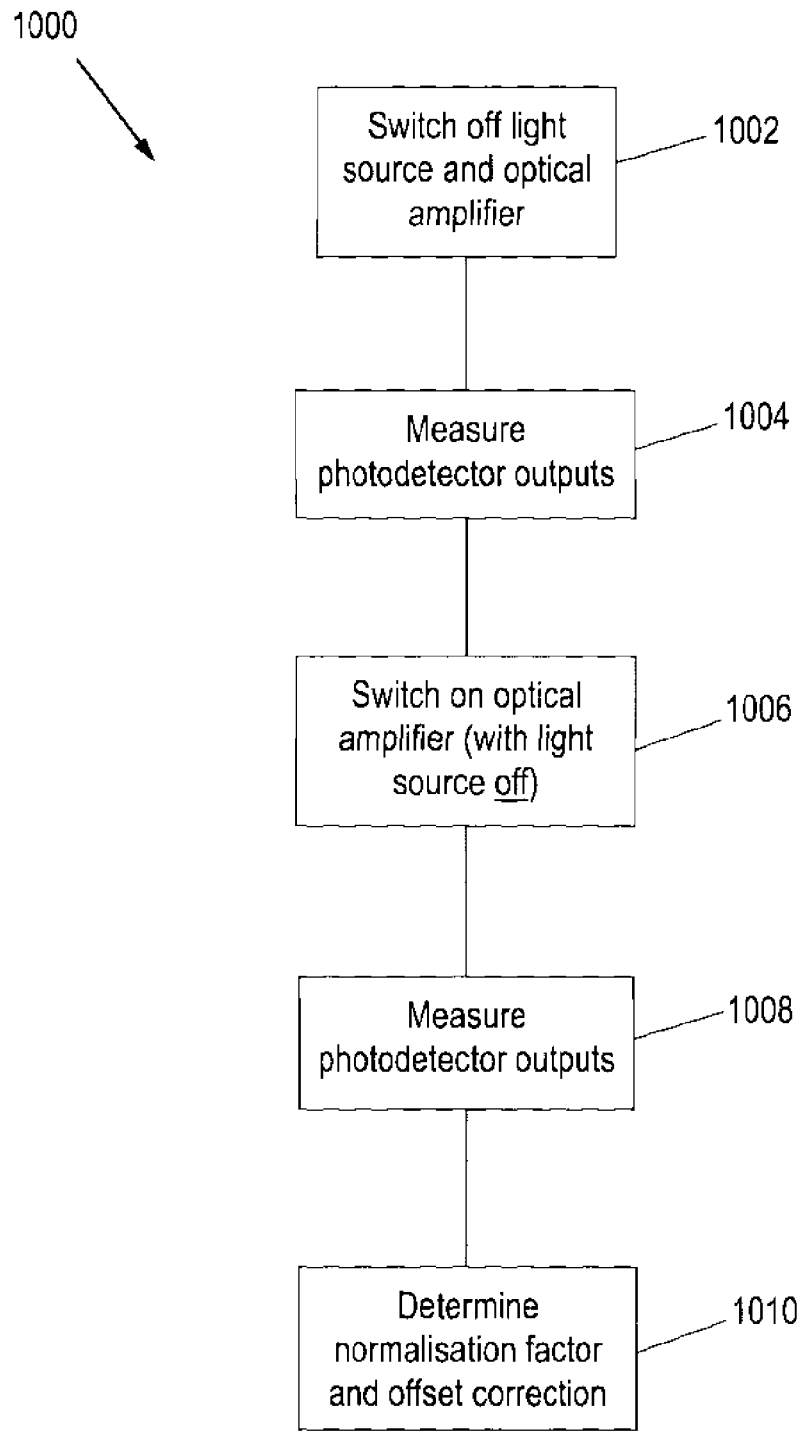
FIG. 10 is a block diagram representing a method of calibrating the interferometer according to an embodiments of the invention.

For accurate phase measurement, it is important to measure the offset signals and the relative gains of the photo-detectors 113, 114 and 115. These can be measured and corrected for by method 1200, described with reference to FIG. 10.

Each photodetector has electrical offset of the photodetectors, i.e. the voltage output of the photodetector when no light is incident on the photodetector (which may be referred to as a "zero-light level" offset). As a first step (at 1202) switching off the incoming light from the optical fibre and the optical amplifier 101. When switched off, the optical amplifier 101 acts as an efficient attenuator, allowing no significant light to reach the photodetectors. The outputs of the photodetectors are measured (step 1204) in this condition to determine the electrical offset, which forms a base level for the calibration.

The relative gains of the photodetectors can be measured, at step 1208, after switching on the optical amplifier 101 while the input light is switched off (step 1206). The in-band spontaneous emission (i.e. the Amplified Spontaneous Emission which falls within the band of the bandpass filter 102), which behaves as an incoherent light source, can then be used to determine normalisation and offset corrections (step 1210) to calibrate the combination of the coupling efficiency between the interferometer arms and the trans-impedance gains of the photodetectors 113, 114 and 115. This signal can also be used to measure the signal offset, which is caused by the in-band spontaneous emission.

Conveniently, the optical amplifier, which is a component of the interferometer, is used as in incoherent light source without a requirement for an auxiliary source. The incoherence of the source is necessary to avoid interference effects at the photodetectors, i.e. the coherence length of the light should be shorter than the optical path length of the interferometer. However, for accurate calibration it is preferable for the frequency band of the source to be close to, or centred around, the frequency of light from the light source. The bandpass filter 102 is therefore selected to filter out light with frequencies outside of the desired bandwidth from the Amplified Spontaneous Emission.

When used in a pulsed system, such as may be used in a distributed sensor, the above-described method can be used between optical pulses from the light source, to effectively calibrate the system during use, before each (or selected) pulses from the light source with substantively no interruption to the measurement process.

Figure 2:
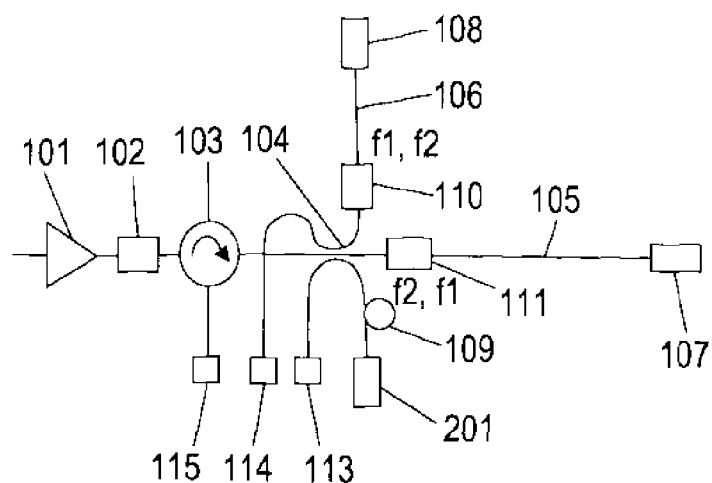

Variations to the above-described embodiments are within the scope of the invention, and some alternative embodiments are described below. FIG. 2 shows another embodiment, generally depicted at 200, of a novel interferometer similar to that shown in FIG. 1 but with an additional Faraday-rotator mirror 201 instead of photodetector 112. Like components are indicated by like reference numerals. In this case the interference between different paths, which may have different path length, can be separated at the three beat frequencies $f_1$, $f_2$ and $(f_2-f_1)$. The arrangement of this embodiment has the advantage of providing additional flexibility in operation, for example the different heterodyne frequencies can provide different modes of operation to generate measurements at different spatial resolutions.

Figure 3:
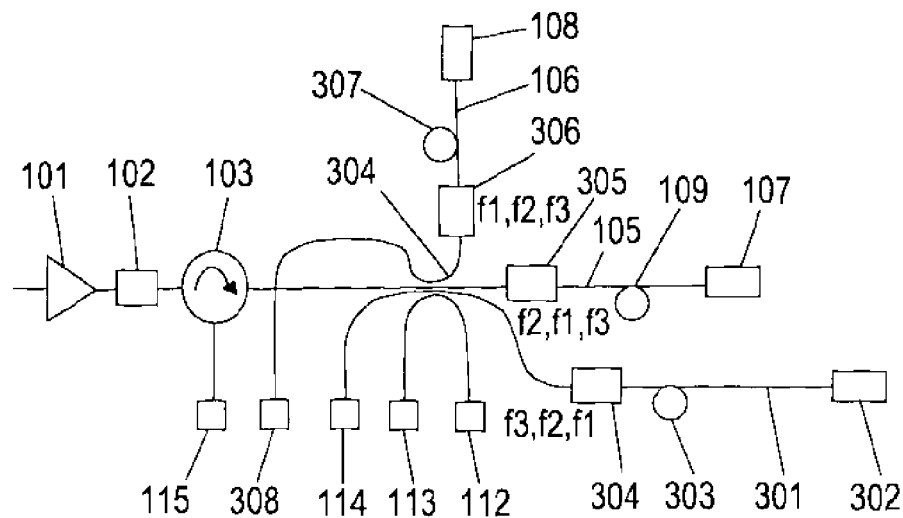

FIG. 3 shows another embodiment of a novel interferometer, generally depicted at 300, similar to the arrangement of FIG. 1, with like components indicated by like reference numerals. However, this embodiment uses a 4×4 coupler 314 and an additional optical path 301, frequency shifter 304, phase modulator 303, Faraday-rotator mirror 302 and additional photo-detector 308. In this case the interference between different paths, which may have different path length differences, can be separated at the three beat frequencies $(f_2-f_1)$, $(f_3-f_2)$ and $(f_3-f_1)$. Alternatively, the Faraday-rotator mirror 302 may be replaced by an isolator or a fibre matched end so that no light is reflected through path 301, so only allowing interference between path 105 and 106.

The 4×4 optical coupler of this arrangement generates four interference signal components at relative phase shifts of −90 degrees, 0 degrees, 90 degrees, 180 degrees.

Figure 4:
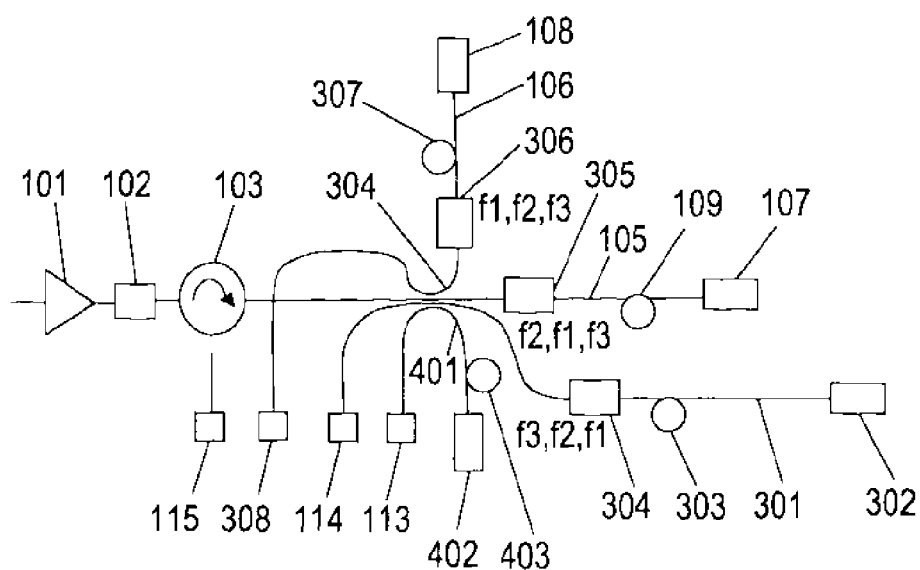

FIG. 4 shows another embodiment of the interferometer. In this case an additional path is introduced in the interferometer by inserting a Faraday-rotator mirror 402 instead of the photo-detector 112.

In all of the above-described embodiments, optical switches may be used to change and/or select different combinations of optical path lengths through the interferometer. This facilitates switching between different spatial resolution measurements (corresponding to the selected path length differences in the optical path lengths).

Figure 5:
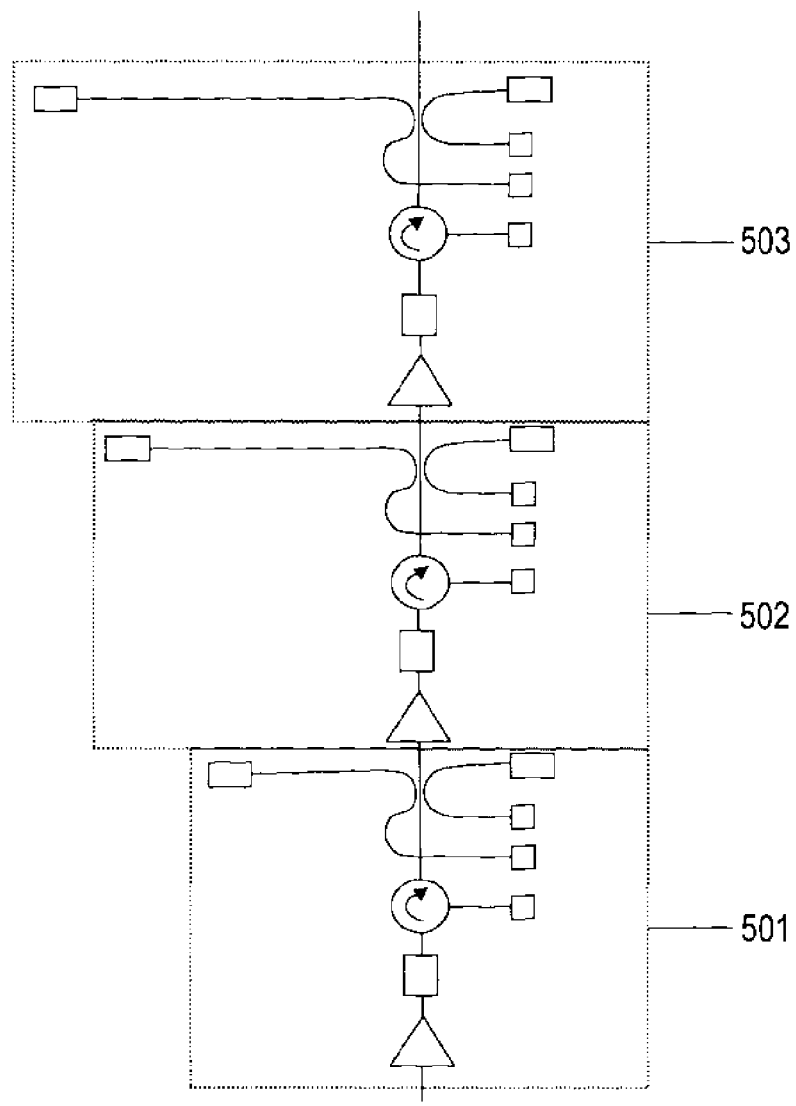
FIGS. 5 and 6 show schematically how the interferometers can be cascaded according to embodiments of the invention in series and/or star configurations.
Figure 6:
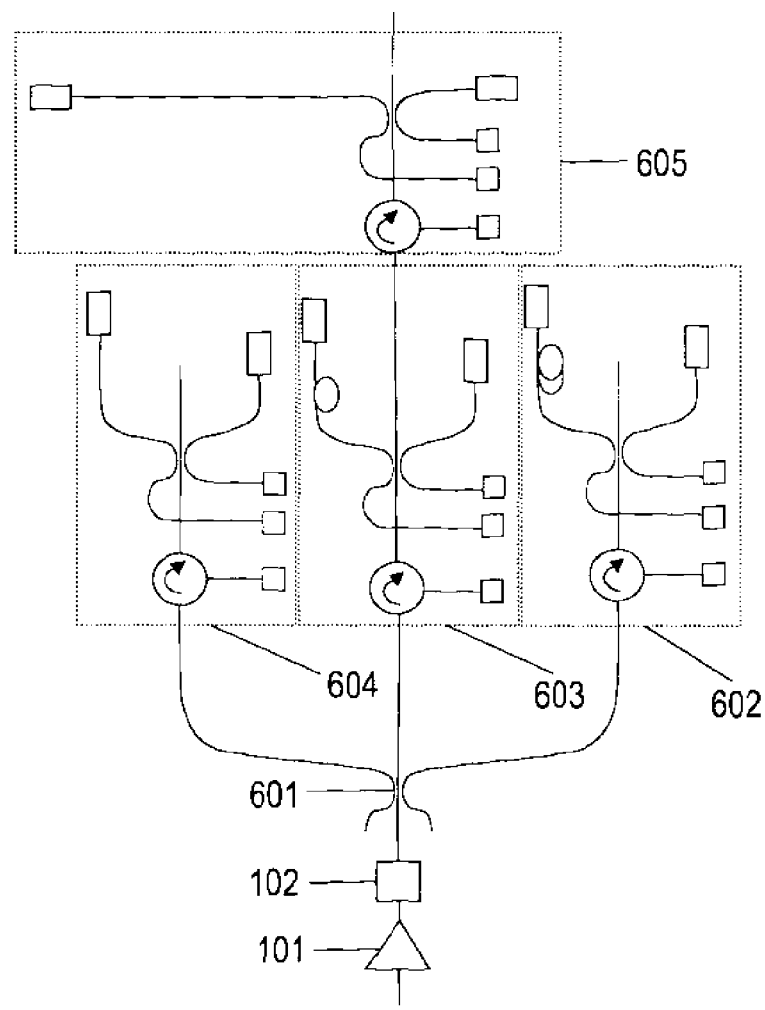

FIGS. 5 and 6 show examples of interferometer systems 500, 600 arranged for used in cascaded or star configurations to allow the measuring of the relative optical phase for different path length differences. In FIG. 5, three interferometers 501, 502, 503 having different path length differences (and therefore different spatial resolutions) are combined in series. In FIG. 6, four interferometers 602, 603, 604 and 605 having different path length differences (and therefore different spatial resolutions) are combined with interferometers 602, 603, 604 in parallel, and interferometers 603 and 605 in series. In FIG. 6, 601 is a 3×3 coupler, used to split the light between the interferometers. Arrangement 600 can also be combined with wavelength division multiplexing components to provide parallel outputs for different optical wavelengths.

The embodiments described above relate to apparatus and methods for fast quantitative measurement of acoustic perturbations of optical fields transmitted, reflected and or scattered along a length of an optical fibre. The invention in its various aspects can be applied or implemented in other ways, for example to monitor an optical signal generated by a laser, and/or to monitor the performance of a heterodyne signal generator, and to generate optical pulses for transmission into an optical signal. An example is described with reference to FIG. 8.

Figure 8:
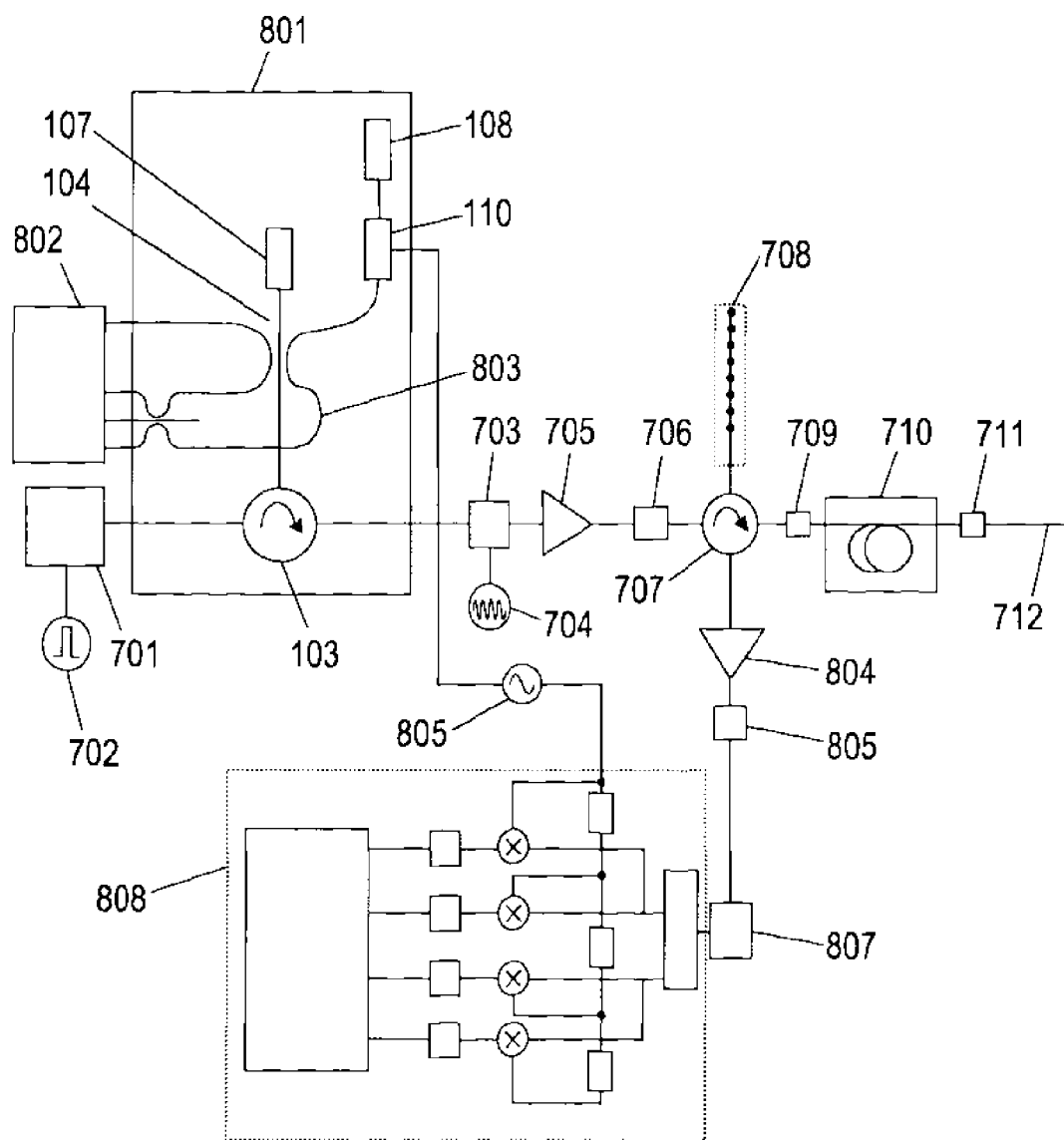
FIG. 8 shows schematically a distributed sensor system that utilises the interferometer of an embodiment of the invention to generate a series of pulses each of different frequency and thereby allowing a different portion of the scattered light to interfere with another portion of the scattered light with a slight frequency shift resulting in a heterodyne beat signal.

FIG. 8 shows a system, generally depicted at 800, comprising an interferometer 801 in accordance with an embodiment of the invention, used to generate two optical pulses with one frequency-shifted relative to the other. The interferometer receives an input pulse from a laser 701, via optical circulator 103. A 3×3 optical coupler 104 directs a component of the input pulse to a photodetector, and components to the arms of the interferometer. One of the arms includes a frequency shifter 110 and an RF signal 805. The interference between the two pulses is monitored by a demodulator 802. The light reflected by Faraday-rotator mirrors 107 and 108 is combined at the coupler 809 using a delay 803 to match the path length of the interferometer, so that the frequency shifted pulse and the input pulse are superimposed. The coupler 809 introduces relative phase shifts to the interference signal, and interferometer therefore monitors three heterodyne frequency signal components at relative phase shifts. The optical circulator 103 passes the two pulses into the sensing fibre.

In this embodiment, the reflected and backscattered light is not detected by an interferometer according to the invention. Rather, the reflected and backscattered light is passed through an optical amplifier 804 and an optical filter 806 and are then sent to a fast, low-noise photodetector 807. The electrical signal is split and then down-converted to baseband signals by mixing the RF signal 805 at different phase angles, in a manner known in the art. The electrical signals are digitised and the relative optical phase modulation at each section of the fibre is computed by combining the digitised signals using a fast processor 808.

Figure 11:
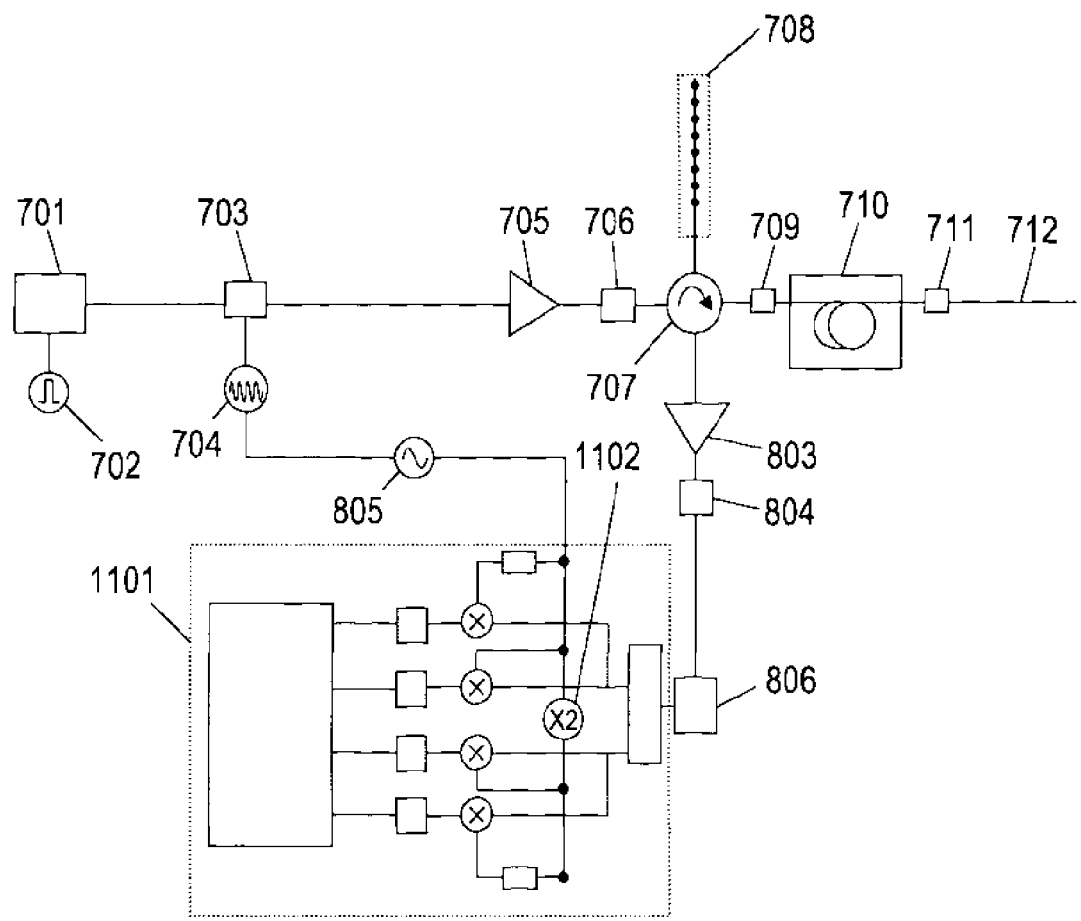
FIG. 11 shows schematically a distributed sensor system the spectrum of the light that is modulated using a fast optical modulator, that generators multiple frequency side bands with part of spectrum being selected using an optical filter.

FIG. 11 shows another embodiment of apparatus for point as well as distributed sensors. In this case the modulation frequency 704 of the optical modulator 703 is switched from f1 to f2 within the optical pulse modulation envelope.

The optical filter 708 selects two modulation frequency sidebands 1202/1203 and 1204/1205 generated by the optical modulator as indicated in FIG. 12. The frequency shift between first order sidebands 1202 and 1203 is proportional to the frequency modulation difference (f2−f1) whereas the frequency shift between $2^{nd}$ order sidebands 1204 and 1205 is proportional to 2(f2−f1). Therefore, the photo-detector output 806 generates two beat signals, one of which is centred at (f2−f1) and the other at 2(f2−f1). Using the demodulator 901, the relative optical phase of the beat signals can be measured independently. The two independent measurements can be combined to improve the signal visibility, the sensitivity and the dynamic range along the sensing fibre.

Figure 12A:
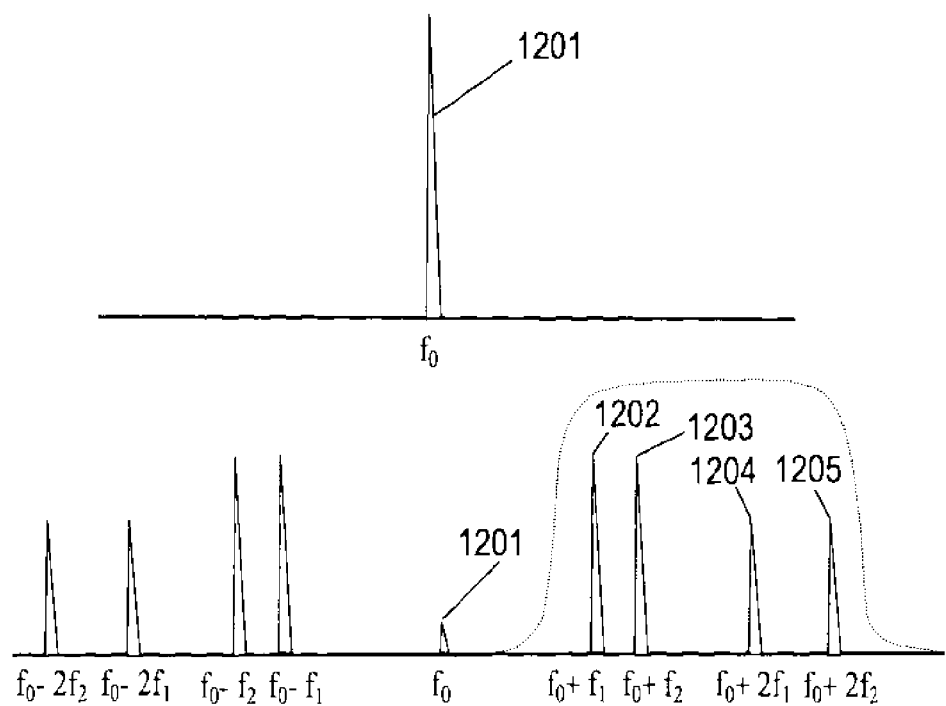
FIG. 12A shows the spectrum of the light modulated and selected using the optical filter for the arrangement shown in FIG. 11.

FIG. 12A shows the modulation spectrum of the light and the selection of the sidebands referred to above.

Figure 12B:
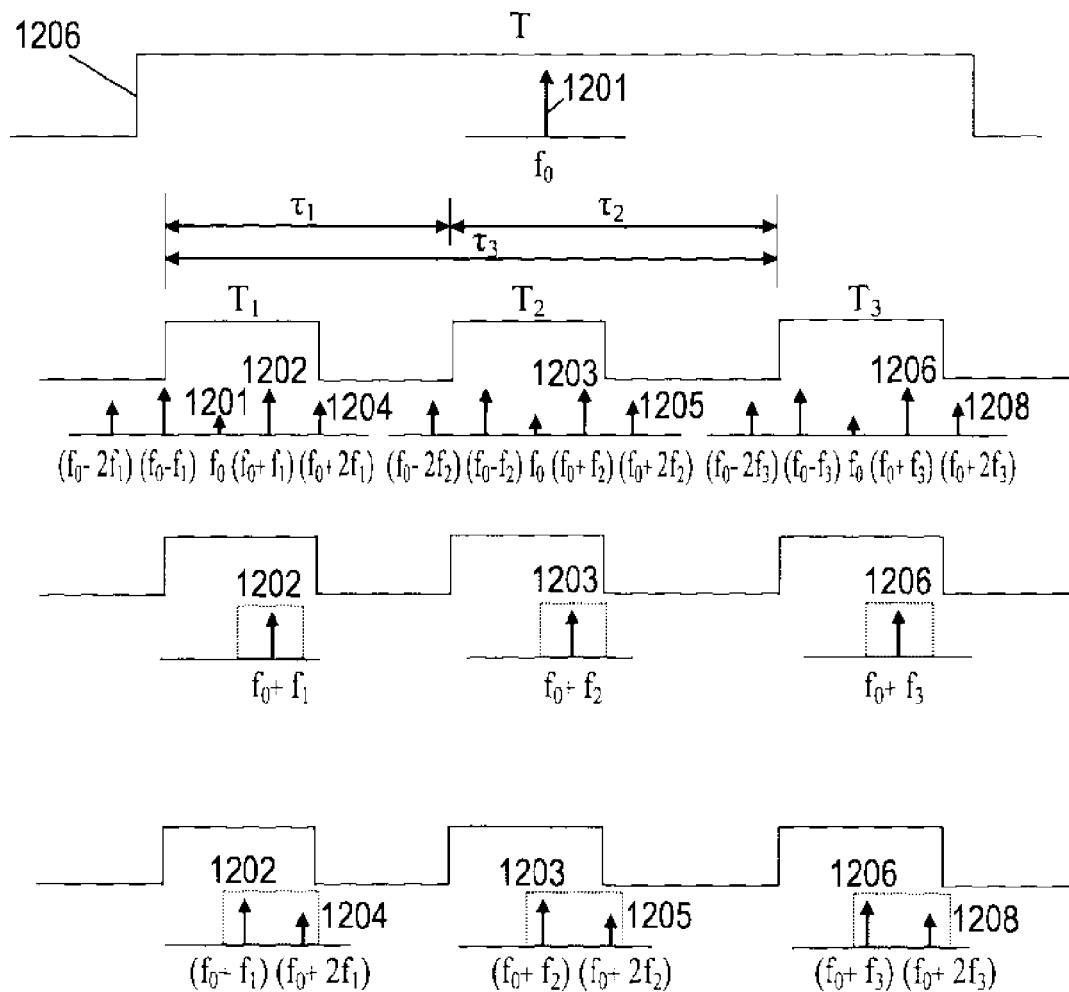
FIG. 12B shows schematically a tinning diagram for a method in accordance with FIG. 11.

FIG. 12B shows the original laser pulse 1206 with pulse width of T at frequency $f_o$ which is modulated at frequency f1, f2 and f3 during a period T1, T2 and T3, respectively. The delay between T1, T2 and T3 can also be varied. One or more modulation sidebands is/are selected with the optical filter 708 to generated a frequency shifted optical pulses that are sent into the fibre. The reflected and/or backscatter signals (709, 710, 711 and 712) from the fibre from is directed to a photodetector receive via a circulator 707. The reflected and or backscatter light from different pulses mix together at the photodetector output to generate heterodyne signals such (f2−f1), (f3−f1), (f3−f2), 2(f2−f1), 2(f3−f1) and 2(f3−f2). Other heterodyne signals are also generated but (2f2−f1), (2f3−f1), (2f1−f2), (2f1−f3), (2f3−f1) and (2f3−f2) are also generated at much higher frequencies. The heterodyne signal are converted down to base band in-phase and quadrature signals. The in-phase and quadrature signals are digitise by a fast analogue to digital convertors and the phase angle is computed using fast digital signal processor.

Figure 13:
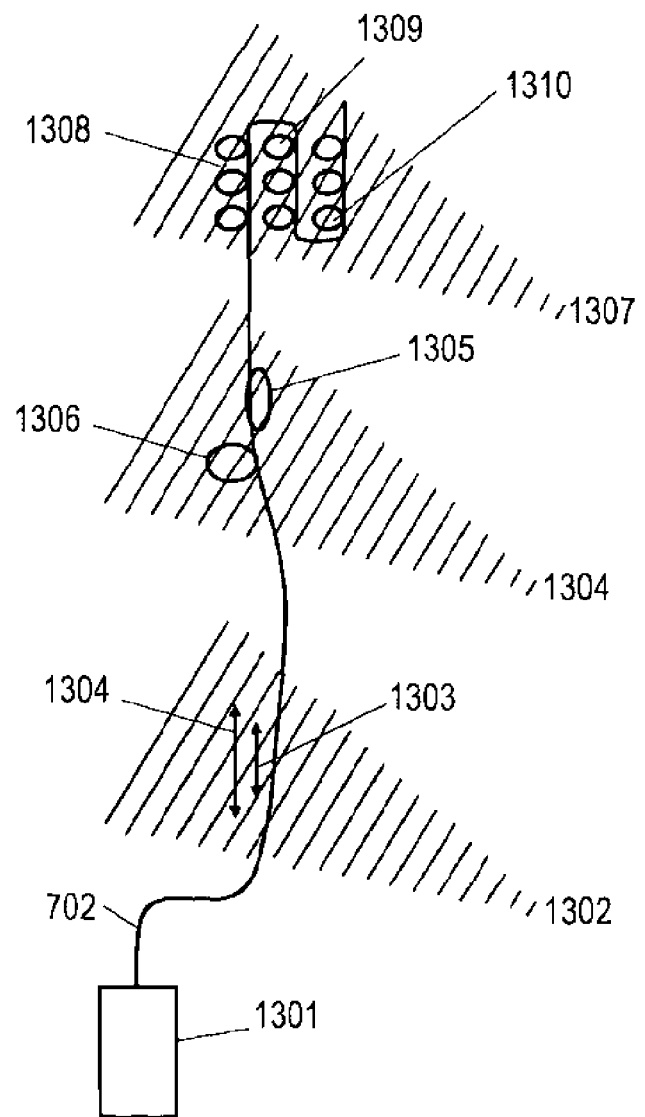
FIG. 13 shows schematically an embodiment in which the fibre can be deployed as linear sensors, directional sensors or in a multidimensional array of sensors.

FIG. 13 shows an embodiment with distributed sensors with the sensing fibre 702 subjected to different perturbation fields 1302, 1304 and 1307. The sensing fibre can be used as linear sensors 1303 and 1304, as directional sensors 1305 and 1306 or as multidimensional array sensors 1308, 1309 and 1310. Since all the measurements are synchronised, they can be processed to enhance the signal sensitivity, achieve a wide dynamic range and provide field imaging using beam forming techniques.

Figure 14:
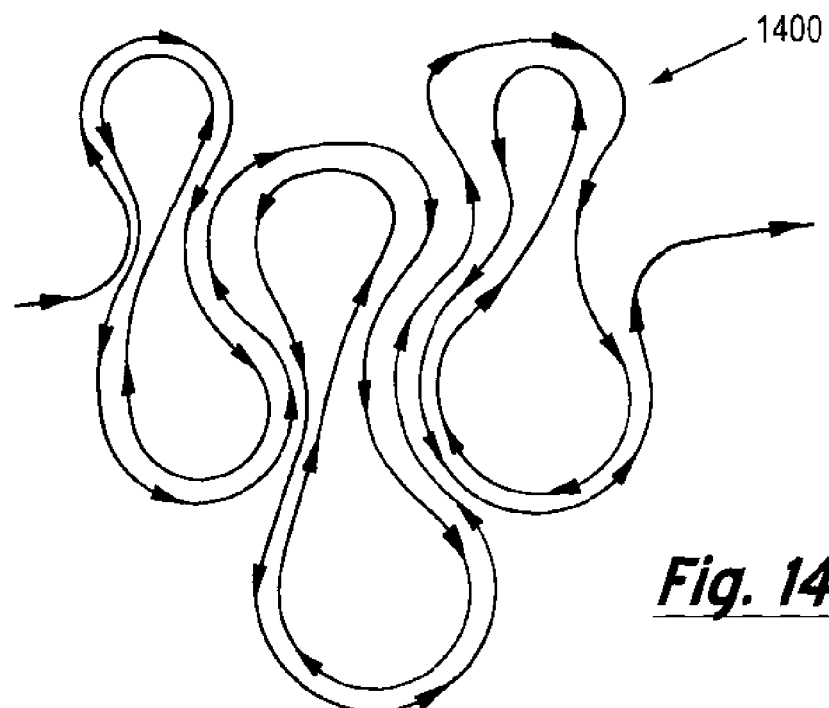
FIGS. 14 to 16 show schematically alternative arrangements of an optical fibre for use in embodiments of the invention.

FIG. 14 shows an optical fibre arrangement 1400, where the fibre is placed on a surface area in a continuous path without crossing over another part of the fibre to increase the sensitivity, in a double figure-eight pattern.

Figure 15:
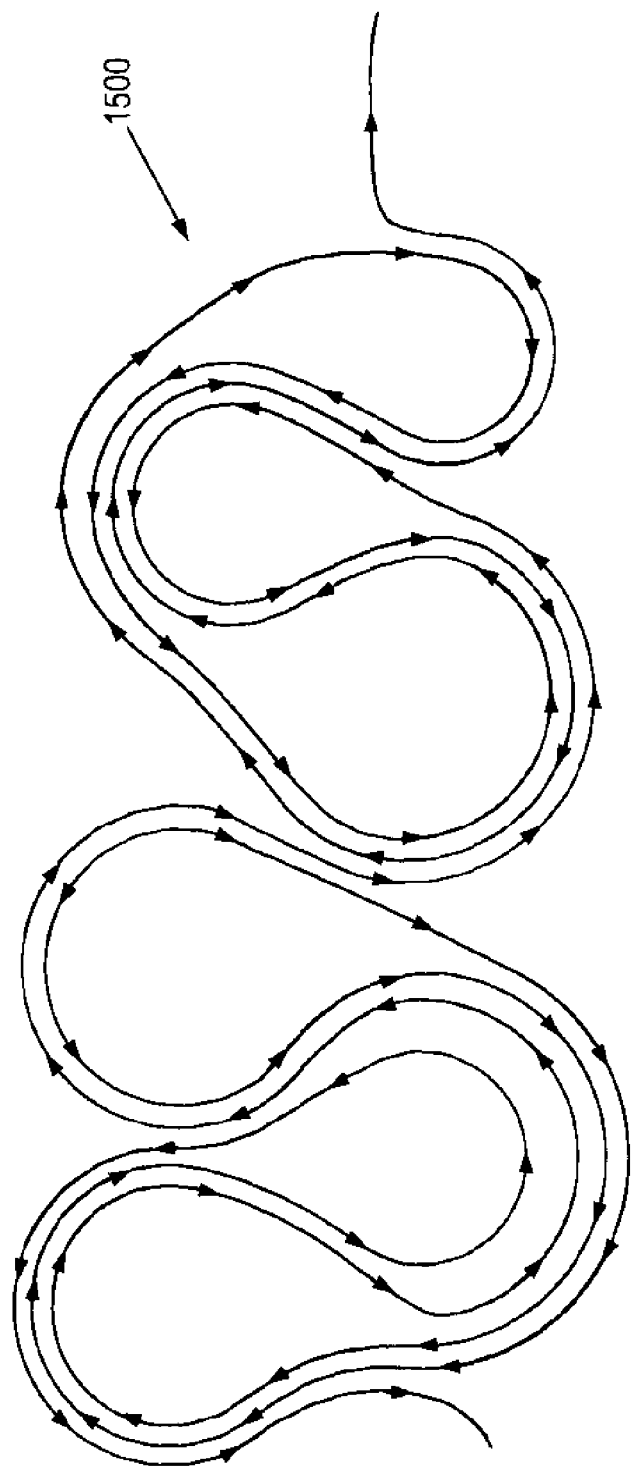

FIG. 15 shows an optical fibre arrangement 1500, where the fibre is placed on a surface area in a continuous path without crossing over another part of the fibre to increase the sensitivity, in a folded three-Omegas (Ω Ω Ω) pattern.

These arrangements are particularly useful to increase the sensing sensitivity, frequency response and the spatial resolution of the sensing system, while simplifying installation techniques and minimising bending losses.

Figure 16:
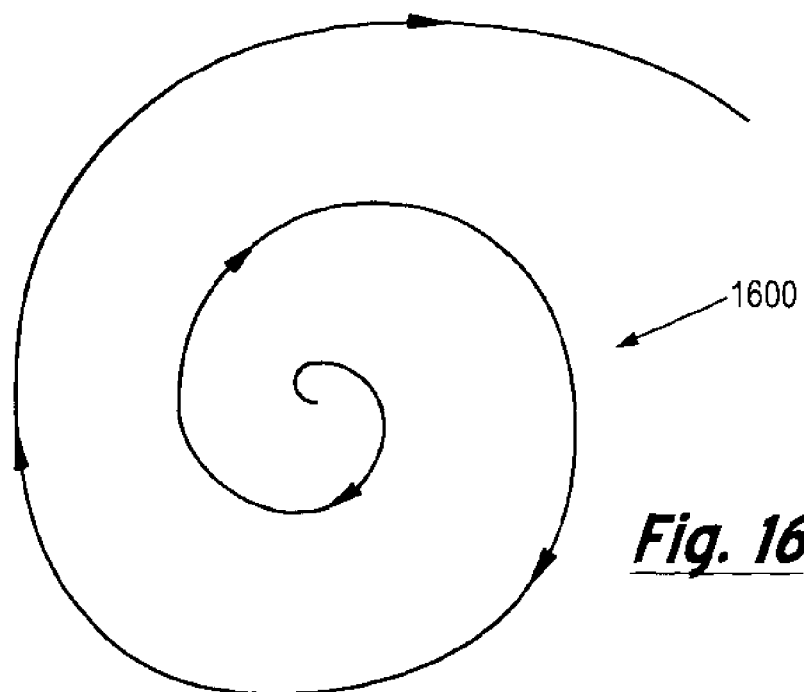

FIG. 16 shows an optical fibre arrangement 1600, where the fibre is placed in a logarithmic spiral pattern to form an acoustic camera or telescope. Acoustic energy can be detected all along a section of fibre. In this case the signals detected along the field are synchronised and using addition signal processing such as beam forming, the near-field and far-field acoustic emission can be mapped. Such an apparatus can be used to look far into the sky, through oceans, deep into the ground, or within vessels. This aspect also provides apparatus for monitoring the environmental noise such as aircraft noise during take-off and landing as well as noise from other flying objects or natural habitats.

Figure 17:
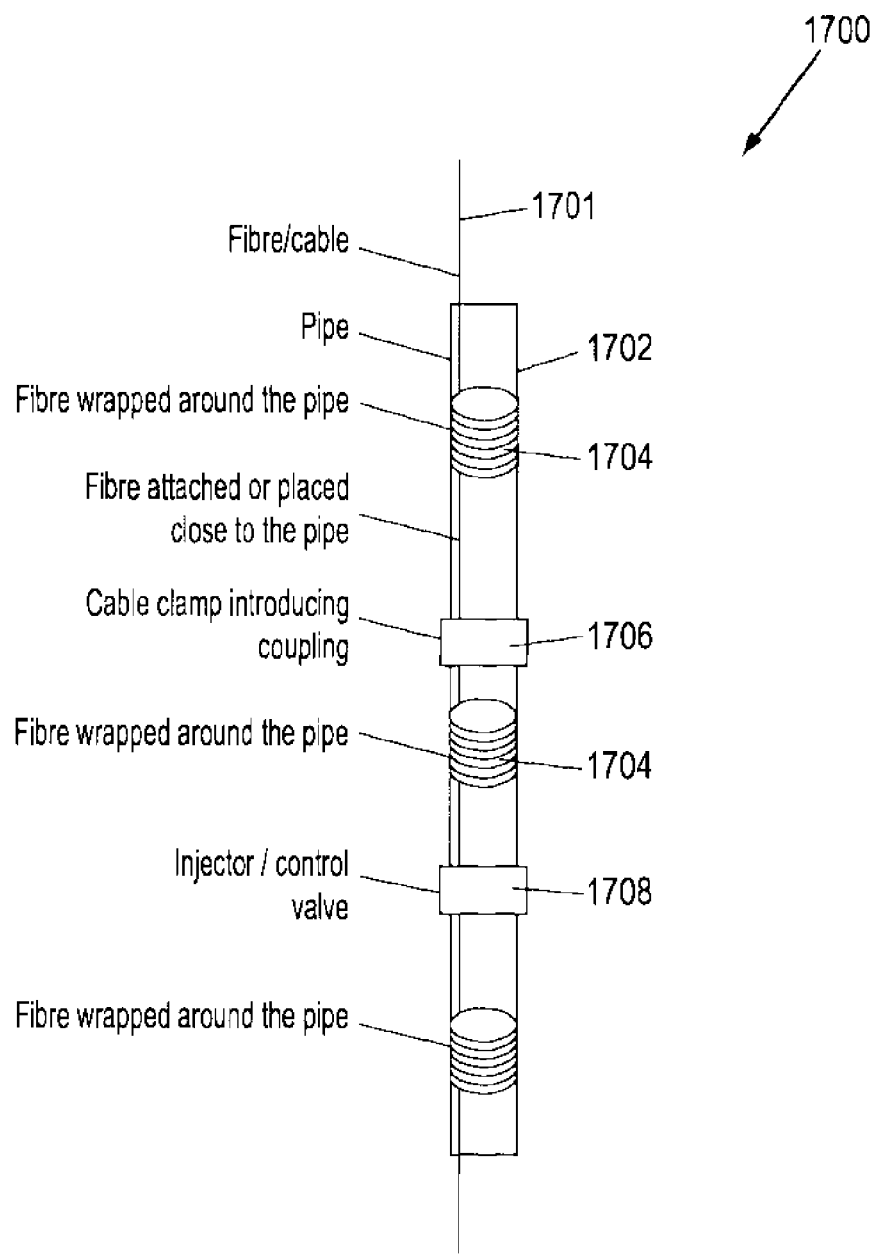
FIGS. 17 to 18 schematically show applications of the invention in various aspects.

FIG. 17 shows at 1700 an application to distributed flow sensing along a pipe 1702 at different sections with fibre 1701 wrapped around the pipe at separated locations 1704 and attached or placed close to the pipe via clamps 1706 to measure the flow noise and pressure variations. This arrangement may also be used to monitor the operation of injector or control valves 1708, and sensors may be used for in-well perforated zones monitoring and sand production monitoring. For example, for in-well applications, the acoustic noise profile can be used to measure the flow by noise logging at every location along the well. In addition, the noise spectrum can be used to identify the phase of the fluid. Further noise spectrum correlation techniques can be used over a long section of the well to determine the speed of sound as well as tracking eddies generated within the flow to accurately determine the flow rates, using analysis techniques for example as described in WO 2006/130499 [14]. This document describes an array of optical fibre acoustic interferometric sensors used to track the speed of the vortices induced pressure waves as a function of the flow. However, the interferometers require discrete components, such as Bragg grating pairs, and a limited number of sensors over a short section of a pipe can be practically be used. With the distributed acoustic sensor of the present invention we can use a flexible method of attaching to or placing close to a pipe a continuous length of optical in an optimised configuration along entire length of pipe. For example the spatial resolution measurements may be increased by wrapping the fibre around the pipe to track the vortices induced pressure waves or simply track the acoustic waves generated and propagated along the pipe to determine the speed of sound both in the same and opposite directions of the flow. The speed of sound is a function of the fluid composition and by mapping the speed of sound one can visualise how the flow profile changes along the pipe.

Also, since we do not require any discrete components, a higher operating temperature can be achieved with proper coating protection applied on to the fibre. The fibre sensitivity can also be enhanced or reduced using different coatings or jackets. Also, the fibre can be made into a continuous cable with an enhanced sensing sensitivity while proving a protection for the fibre in harsh environments.

Figure 18:
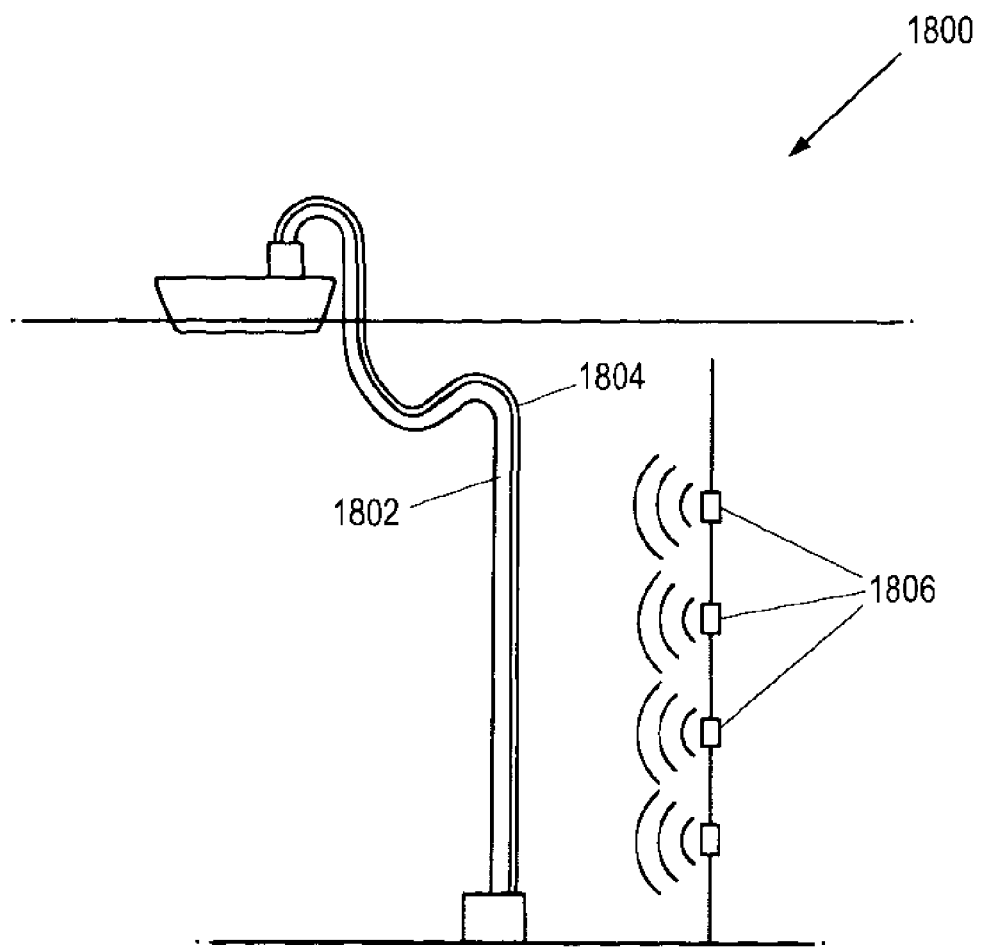

FIG. 18 shows at 1800 an application to dynamic positioning of a riser 1802 using acoustic fibre optic sensors 1804 and acoustic reference sources 1806 whereby the optical fibre sensor 1804 measures the time of flight of acoustic signals received at different locations along the riser and thereby determines the position of the riser.

Review of Features of the Invention in Various Aspects and Embodiments

In one aspect, the invention provides an optical interferometer apparatus which can provide multiple path differences between the optical signals and provide interference signals between different optical paths with fixed and/or variable phase shifts. The interferometer utilises beam splitting components, circulating devices and Faraday rotator mirrors in a novel configuration. The optical signals at the output of the interferometer are converted to electrical signals which digitised for fast processing. The offset levels of the electrical signals are removed and their amplitude are normalised. The relative phase shifts of optical signals are accurately determined by combining the normalised electrical signals.

In another aspect, the invention relates to an interferometer apparatus that utilises beam splitters and non-reciprocal devices to provide light interference with given phase shifts and path length differences that can be measured at all ports of the beam splitters whereby the relative phase modulation of the light can be computed very accurately and quickly, such as at every few nanoseconds. The interferometer may use optical fibre components such as an m×m fused optical fibre coupler that is connected to an optical fibre circulator at one of its ports; Faraday-rotator mirrors that reflect and, at the same time, provide polarisation compensation for the light propagating through the different paths of the interferometer and photodetectors that are used to measure the interference light signals. The incoming optical light may be amplified using an optical fibre amplifier, and preferably the interferometer has a pass band optical filter to filter out the out of band Amplified Spontaneous Emission noise (ASE). The interferometer may provide birefringence compensation for light propagating along different optical paths through the interferometer. This provides sufficiently high visibility at the outputs of the interferometer.

In another of its aspects, the invention provides a method for compensating the offset and the gain of the photo-detectors, and the coupling ratio of the interferometer arms, to normalise the resultant interference signals used to measure the relative phase of the modulated input light in any of preceding claims where the detector offset is measured by switching off the optical amplifier in the backscatter path; the resultant photo-detector offset and gain then being determined by switching on the amplifier while the input light is switched off; the ASE of the optical amplifier then acts as an independent incoherent light source and thereby the offsets and relative gains of the photo-detectors can be determined and the detected light signals normalised. The method may therefore use incoherent light that enters the input of the interferometer to normalise the relative signal amplitudes at the output of the photo-detectors. For example, when an optical preamplifier is used at the input of the interferometer, the spontaneous light emission can be used to measure the combination of the splitting ratio of the interferometer arms and the relative gains of the photo-detectors and thereby normalise the relative signal amplitudes accordingly.

Another additional feature of the present invention is to use phase modulators and/or frequency shifters to shift the relative frequency and or vary the phase between the optical paths of the interferometer. Frequency shifters and/or phase modulators may be used to provide heterodyne signals and/or to separate the resultant interference light signal from different paths through the interferometer.

An additional feature of an embodiment of the invention is selecting the frequency of the frequency shifter sufficiently high so that at least one cycle of the beat frequency results within one light pulse resolution. Different frequency shifts may be used between different optical paths of the interferometer for the separation and/or heterodyne detection of the phase between different optical paths. The frequency shifts between different optical paths may be alternated to correct for any frequency dependency of the interferometer output signals.

An additional feature of an embodiment of the invention is the selection of different optical paths through the interferometer such as by using optical switches. The optical switches may be used to select different optical paths through the interferometer and thereby select a different spatial resolution measurement. Another aspect of the invention relates to a system comprising a number of interferometers cascaded in a series or in a star configuration or a combination of both.

The invention also provides a system that utilises a light pulse for multiplexed and/or distributed sensors by measuring the phase modulation of the reflected and/or the backscattered light along a length of fibre with high sensitivity, high dynamic range and a high speed of over tens of kilohertz. In this way, the invention can provide a multiplexed and/or distributed acoustic sensing system.

An additional feature of an embodiment of the invention is digitising the outputs of the interferometer, or the photo-detectors of the interferometer, at least twice over a spatial resolution interval. An additional feature of an embodiment of the invention is combining the outputs of the interferometer to determine the insensitive measurement sample points resulting from any signal fading of the light in order to reject and/or provide a weighted signal average of the multiple samples of the light over a given spatial resolution measurement or interval. Embodiments of the invention use a digitiser with dynamically varying clock cycles, (which may be referred to herein as "iclock"), to adjust the timing of the digital sampling of the light for the maximum signal sensitivity positions. The dynamically varying clock may be used to adjust the timing of the digitised samples at the photo-detector outputs for the position of maximum signal sensitivity and or shifted away where light signal fading occurs.

A further aspect of the invention provides frequency shifted light, using a fast optical modulator to generate sidebands, preferably with a suppressed carrier spectrum, and a band-pass optical filter to select the modulation sidebands whereby the modulation frequency is varied rapidly between two portions of light pulse propagating through the optical modulator. The optical modulator may also chop off a portion of light pulse in the middle so as to generate two pulses with different frequencies. In this case the reflected and/or the backscattered light generated by the two pulses are combined to result in a heterodyne signal whose phase is determined to measure the relative optical phase modulation along the sensing fibre.

Providing multiple heterodyne signals can improve the dynamic range and reduce the effect of signal fading. When the scattered and/or the reflected light from the two pulses are combined, the modulation sidebands generate different beat frequencies which are proportional to the modulation frequency difference and to the order of the sidebands. The frequency of the light may be changed to optimise the signal sensitivity over a given section of the fibre. The frequency of the light passing through the optical modulator may be changed rapidly so that at least two portions of light pulse have different modulation sideband frequencies and, in addition, part of the light pulse may be chopped to generate two distinct portions of light pulses with different modulation sideband frequencies. The modulation sidebands between the two portions of the light pulse scattered or reflected from a sensing fibre may beat together to generate multiple heterodyne signals at multiples of the frequency difference between the two pulses that are proportional to the order of the modulation sidebands.

Embodiments of the invention may use a laser light or a broadband light source. Coherent matching of the light with the same delay results in an interference signal that can be used to measure the relative phase modulation of the scattered or reflected light along the fibre. The invention may use wavelength division multiplexed components to utilise multiple laser light pulses with different wavelengths and, preferably, varying time shift with respect to each to control the cross-phase modulation between the light pulses and to allow the processing of multiple pulses in the sensing fibre without and cross-sensitivity to allow the system to achieve a higher measurand frequency response. This may be the acoustic frequency response of the system to provide a different spatial sampling resolutions and/or positions, and/or to allow the efficient rejection of any points with low sensitivity.

An additional feature of an embodiment of the invention is the selection of different spatial resolutions whereby the sensitivity and the frequency response along the sensing fibre can be adjusted, and the dynamic range can be widened.

The sensing fibre may be standard single mode fibre, polarisation maintaining fibre, a single polarisation fibre, and or a ribbon fibre, and it can be coated and or cabled to enhance or to suppress its sensitivity.

An additional feature of an embodiment of the invention is the selection of different configurations of the fibre to optimise the sensitivity, the frequency and the directionality of the sensing fibre at different locations. The fibre may be deployed as linear sensors, direction sensors or multidimensional array sensors. The fibre may be placed on a surface area in a continuous path without crossing over another part of the fibre to increase the sensitivity, the frequency response and or the spatial resolution of the sensor system such as in a folded three-Omegas (Ω Ω Ω) and or double eights (88) configurations. This is particularly useful to increase the sensing sensitivity, frequency response and the spatial resolution of the sensing system, while simplifying installation techniques and minimising bending losses.

The fibre may be attached on a surface of a vessel to listen to the noise generated within the vessel to monitor the changes in the process, acoustically image the process, as well to detect any leaks.

A further aspect provides an apparatus using acoustic sensors for distributed flow measurement and imaging, in-well perforated zones monitoring and sand production monitoring. For example, for in-well applications, the acoustic noise profile can be used to measure the flow by noise logging at every location along the well. In addition, the noise spectrum can be used to identify the phase of the fluid. Further noise spectrum correlation techniques can be used over a long section of the well to determine the speed of sound as well as tracking eddies generated within the flow to accurately determine the flow rates.

The sensor systems may be used as a distributed acoustic sensor, enabling the determination of distributed flow measurement and imaging, perforated zones monitoring and sand production monitoring in oil and gas wells and flowlines. The distributed temperature and strain measurements may be combined to enhance the data interpretation of the distributed acoustic sensor.

A further application is listening along previously installed optical fibres for surveillance applications. This includes measurements along fibres installed along boreholes, pipelines, perimeters, ports and borders.

An additional aspect provides a dynamic positioning apparatus using acoustic fibre optic sensors and acoustic reference sources whereby the optical fibre sensor measures the time of flight of acoustic signals received at different locations along the structure and thereby determines its position.

A further aspect provides pipeline structure monitoring apparatus using an acoustic fibre sensor and a pig that emits a sound (known as a "whistling pig"). The optical fibre sensor measures the acoustic transmission through the wall of the pipe for diagnostics as well as for tracking the position of the pig.

Another aspect provides pipeline monitoring apparatus where the sensing fibre is deployed inside the pipeline and carried along the pipeline by the fluid drag to provide a measurement of the noise flow for diagnostics of the pipeline as well as for flow characterisation and/or imaging.

Another aspect provides an apparatus using a fibre sensor used for acoustic sensing and an energy harvesting self-powered acoustic source to generate sufficient acoustic emission that can be picked up by a nearby sensing fibre for data communication, measurement, diagnostics and surveillance applications including along long pipelines, in-well and in other remote applications.

Another aspect of the invention provides an apparatus using acoustic fibre sensors to measure seepage rates along dams and dykes by generating an acoustic noise source in the upstream reservoir or in the core of the dam and measuring the acoustic signal strength detected along the fibre whereby areas of seepage act as low acoustic impedance paths for acoustic wave transmission and thereby exhibiting louder signal levels.

Other advantages and applications of the invention will be apparent to those skilled in the art. Any of the additional or optional features can be combined together and combined with any of the aspects, as would be apparent to those skilled in the art.

Concluding Remarks

As has been described above, apparatus and methods for fast quantitative measurement of perturbations of optical fields transmitted, reflected and/or scattered along a length of an optical fibre. In particular, the invention can be used for distributed sensing while extending dramatically the speed and sensitivity to allow the detection of acoustic perturbations anywhere along a length of an optical fibre while achieving fine spatial resolution. The present invention offers unique advantages in a broad range of acoustic sensing and imaging applications. Typical uses are for monitoring oil and gas wells such as for distributed flow metering and/or imaging, monitoring long cables and pipelines, imaging of large vessels as well as security applications.

There follows a set of numbered features describing particular embodiments of the invention. Where a feature refers to another numbered feature then those features may be considered in combination.

1. An optical sensor system comprising: a light source generating a pulsed optical signal; an optical sensing fibre configured to receive the optical signal; an optical modulator for generating frequency sidebands in the optical signal; an optical filter configured to controllably select one or more of the modulation sidebands, and, thereby vary the frequency of the light input to the sensing fibre.

2. The system of feature 1, where the frequency of the light is changed to optimise the signal sensitivity over a given section of the fibre.

3. The system of feature 1 or feature 2, where the frequency of the light passing through the optical modulator is changed rapidly so that at least two portions of light pulse have different modulation sideband frequencies.

4. The system of any preceding feature wherein part of the light pulse is chopped to generate two distinct portions of light pulses with different modulation sideband frequencies.

5. The system of feature 4 wherein the modulation sidebands between the two portions of the light pulse scattered or reflected from a sensing fibre beat together to generate multiple heterodyne signals at multiples of the frequency difference between the two pulses that are proportional to the order of the modulation sidebands.

6. The system any preceding feature wherein the light source is a laser light or a broadband light source.

7. The system any preceding feature wherein using wavelength division multiplexed components to utilise multiple laser light pulses with different wavelengths and, preferably, varying time shift with respect to each to control the cross-phase modulation between the light pulses and to allow the processing of multiple pulses in the sensing fibre without and cross-sensitivity to allow the system to achieve a higher measurand frequency response, such as higher acoustic frequency response, and to allow the efficient rejection of any points with low sensitivity.

8. The system of any of the above features where the sensing fibre is a single mode fibre, polarisation maintaining fibre, a single polarisation fibre, multimode fibre and or a ribbon fibre.

9. The sensor system of any preceding feature used as a distributed acoustic sensor.

10. The sensor system of feature 9 where the distributed sensor can be connected to standard optical fibre for pipelines, perimeters, ports or border security.

REFERENCES

[1] U.S. Pat. No. 6,555,807, Clayton et al.
[2] WO 98/27406, Farhadiroushan et al.
[3] U.S. Pat. No. 7,355,163, Watley et al.
[4] U.S. Pat. No. 5,194,847, Taylor et al.
[5] Shatalin, Sergey et al., "Interferometric optical time-domain reflectometry for distributed optical-fiber sensing", Applied Optics, Vol. 37, No. 24, pp. 5600-5604, 20 Aug. 1998.
[6] WO 2008/056143, Shatalin et al.
[7] WO 2004/102840, Russel et al.
[8] GB 2445364, Strong et al.
[9] US 2009/0114386, Hartog et al.
[10] WO 2009/056855, Hartog et al.
[11] WO 2007/049004, Hill et al.
[12] Zhiqiang Zhao et al., "Improved Demodulation Scheme for Fiber Optic Interferometers Using an Asymmetric 3×3 Coupler", J. Lightwave Technology, Vol. 13, No. 11, November 1997, pp. 2059-2068
[13] U.S. Pat. No. 5,946,429, Huang et al
[14] WO 2006/130499, Gysling et al.

The invention claimed is:

1. An apparatus for monitoring seepage along a dam or a dyke, the apparatus comprising:
an optical fiber distributed acoustic sensing system, the optical fiber distributed acoustic sensing system comprising an optical sensing fiber deployed in use along the dam or dyke and arranged to receive an input optical signal and propagate the received optical signal along its length; and
an acoustic source located in use within a body of fluid contained by the dam or dyke, or within the dam or dyke itself;
wherein the optical fiber distributed acoustic sensing system is arranged in use to process light backscattered and/or reflected from along the optical sensing fiber as the optical signal travels therealong, the light being backscattered and/or reflected in dependence on acoustic signals incident along the length of the optical sensing fiber, the backscattered and/or reflected light being processed to determine a relative optical phase modulation along at least one section of the optical sensing fiber to thereby measure a strength of an acoustic signal generated by the acoustic source, and to determine areas of seepage in the dam or dyke based thereon;
wherein the optical fiber distributed acoustic sensing system is arranged in use to detect a louder acoustic signal in areas of seepage, wherein areas of seepage provide low acoustic impedance paths for acoustic wave transmission.

2. An apparatus according to claim 1, wherein the optical fiber distributed acoustic sensing system includes an interferometer arranged to receive backscattered light from along the optical sensing fiber, the interferometer comprising at least two optical paths with a path length difference therebetween, the backscattered light interfering in the interferometer to produce interference components, the DAS system further comprising plural photodetectors to measure the interference components, and a processor arranged to determine optical phase angle data therefrom.

3. An apparatus of claim 2, wherein the interferometer further comprises an optical coupler arranged to introduce a relative phase shift between the interference components.

4. An apparatus of claim 2, wherein the interferometer further comprises an optical amplifier arranged to amplify the received backscattered light to produce an amplified light signal.

5. An apparatus of claim 4, wherein the interferometer further comprises an optical filter to filter out the out of band Amplified Spontaneous Emission (ASE) noise generated by the optical amplifier from the amplified light signal.

6. An apparatus according to claim 1, wherein the optical fiber distributed acoustic sensing system includes an interferometer arranged to receive reflected light from along the optical sensing fiber, the interferometer comprising at least two optical paths with a path length difference therebetween, the reflected light interfering in the interferometer to produce interference components, the DAS system further comprising plural photodetectors to measure the interference components, and a processor arranged to determine optical phase angle data therefrom.

7. An apparatus of claim 6, wherein the interferometer further comprises an optical coupler arranged to introduce a relative phase shift between the interference components.

8. An apparatus of claim 6, wherein the interferometer further comprises an optical amplifier arranged to amplify the received reflected light to produce an amplified light signal.

9. An apparatus of claim 8, wherein the interferometer further comprises an optical filter to filter out the out of band Amplified Spontaneous Emission (ASE) noise generated by the optical amplifier from the amplified light signal.

10. An apparatus of claim 6, wherein the interferometer is further arranged to receive backscattered light from along the optical sensing fiber.

11. An apparatus according to claim 1, wherein the optical fiber distributed acoustic sensing system comprises an optical source configured to output a pulsed optical signal.

12. An apparatus according to claim 1, wherein the optical sensing fiber is arranged in use to receive a pulsed optical signal, the pulsed optical signal being constrained by the optical sensing fiber such that it propagates therealong in a first direction, the pulsed optical signal being backscattered and/or reflected along the length of the optical sensing fiber, the backscattered and/or reflected light being constrained by the optical sensing fiber such that it propagates therealong in a second direction opposite the first direction, wherein acoustic perturbations generated by the acoustic signal of the acoustic source incident along the length of the optical sensing fiber cause the optical sensing fiber to expand and contract such that the backscattered and/or reflected light is modulated.

13. An apparatus according to claim 12, wherein the optical fiber distributed acoustic sensing system comprises a means for receiving the backscattered and/or reflected light from along the length of the optical sensing fiber.

14. An apparatus according to claim 13, wherein the means for receiving comprises optical componentry.

15. An apparatus according to claim 13, wherein the optical fiber distributed acoustic sensing system comprises a means for processing the received backscattered and/or reflected light to measure the phase, frequency and amplitude data of the received backscattered and/or reflected light to provide quantitative measurements of the acoustic perturbations incident along the length of the fiber to thereby measure a strength of the acoustic signal generated by the acoustic source, wherein the processing comprises measuring the backscattered and/or reflected light received from each contiguous section of optical sensing fiber along its length based on the time taken for the pulsed optical signal to propagate along the length of the optical fiber in the first direction, and the time taken for the backscattered and/or reflected light to propagate back in the second direction, to thereby map the received backscattered and/or reflected light to a respective section of optical fiber.

16. An apparatus according to claim 15, wherein the means for processing comprises a plurality of photodetectors and a processor.

17. A method of monitoring seepage along a dam or dyke using an optical fiber distributed acoustic sensing system, the method comprising:
   measuring, using the optical fiber distributed acoustic sensing system, an acoustic signal generated by an acoustic source located within the body of fluid contained by the dam or dyke, or within the dam or dyke itself, wherein the optical fiber distributed acoustic sensing system:
      transmits an optical signal into an optical sensing fiber deployed along the dam or dyke, the optical signal being backscattered and/or reflected in dependence on acoustic signals incident along the length of the optical sensing fiber; and
      processes the backscattered and/or reflected light to determine a relative optical phase modulation along at least one section of the optical sensing fiber to thereby measure a strength of the acoustic signal generated by the acoustic source; and
   determining areas of seepage in the dam or dyke based on the measured acoustic signal, wherein the optical fiber distributed acoustic sensing system detects a louder acoustic signal in areas of seepage, wherein areas of seepage provide low acoustic impedance paths for acoustic wave transmission.

18. A method according to claim 17, wherein the method further comprises:
   transmitting a pulsed optical signal into the optical sensing fiber, the pulsed optical signal being constrained by the optical sensing fiber such that it propagates therealong in a first direction, the pulsed optical signal being backscattered and/or reflected along the length of the optical sensing fiber, the backscattered and/or reflected light being constrained by the optical sensing fiber such that it propagates therealong in a second direction opposite the first direction, wherein acoustic perturbations generated by the acoustic signal of the acoustic source incident along the length of the optical sensing fiber cause the optical sensing fiber to expand and contract such that the backscattered and/or reflected light is modulated;
   receiving the backscattered and/or reflected light from along the length of the optical sensing fiber; and
   processing the received backscattered and/or reflected light to measure the phase, frequency and amplitude data of the received backscattered and/or reflected light to provide quantitative measurements of the acoustic perturbations along the length of the optical sensing fiber to thereby measure the strength of the acoustic signal generated by the acoustic source.

19. A method according to claim 18, wherein the processing comprises measuring the backscattered and/or reflected light received from each contiguous section of optical sensing fiber along its length based on the time taken for the pulsed optical signal to propagate along the length of the optical fiber in the first direction, and the time taken for the backscattered and/or reflected light to propagate back in the second direction, to thereby map the received backscattered and/or reflected light to a respective section of optical fiber.

20. A dam or dyke comprising:
   an optical fiber distributed acoustic sensing system, the optical fiber distributed acoustic sensing system comprising an optical sensing fiber deployed in use along the dam or dyke and arranged to receive an input optical signal and propagate the received optical signal along its length; and
   an acoustic source located within a body of fluid contained by the dam or dyke, or within the dam or dyke itself;
   wherein the optical fiber distributed acoustic sensing system is arranged to process light backscattered and/or reflected from along the optical sensing fiber as the optical signal travels therealong, the light being backscattered and/or reflected in dependence on acoustic signals incident along the length of the optical sensing fiber, the backscattered and/or reflected light being processed to determine a relative optical phase modulation along at least one section of the optical sensing fiber to thereby measure a strength of an acoustic signal generated by the acoustic source, and to determine areas of seepage in the dam or dyke based thereon;
   wherein the optical fiber distributed acoustic sensing system is arranged to detect a louder acoustic signal in areas of seepage, wherein areas of seepage provide low acoustic impedance paths for acoustic wave transmission.

* * * * *